United States Patent
Singh et al.

(10) Patent No.: US 9,912,818 B2
(45) Date of Patent: Mar. 6, 2018

(54) METHODS AND APPARATUSES FOR CONNECTING CONSUMERS TO LOCAL SERVICE PROVIDERS

(71) Applicant: Seva Search, Inc., Potomac, MD (US)

(72) Inventors: Manpreet Singh, Potomac, MD (US); Gurpreet Singh, Potomac, MD (US); Amandeep Singh Bakshi, Burtonsville, MD (US); Vighna Rajesh Karyampudi, Potomac, MD (US)

(73) Assignee: Seva Search, Inc., Potomac, MD (US)

( * ) Notice: Subject to any disclaimer, the term of this patent is extended or adjusted under 35 U.S.C. 154(b) by 0 days.

(21) Appl. No.: 15/195,975

(22) Filed: Jun. 28, 2016

(65) Prior Publication Data

US 2016/0381227 A1   Dec. 29, 2016

Related U.S. Application Data

(60) Provisional application No. 62/186,263, filed on Jun. 29, 2015.

(51) Int. Cl.
| | |
|---|---|
| H04M 3/42 | (2006.01) |
| H04M 3/00 | (2006.01) |
| H04M 5/00 | (2006.01) |
| H04M 3/56 | (2006.01) |
| G06Q 30/06 | (2012.01) |
| G06Q 50/00 | (2012.01) |

(52) U.S. Cl.
CPC .......... *H04M 3/56* (2013.01); *G06Q 30/0601* (2013.01); *H04M 3/42348* (2013.01); *G06Q 50/01* (2013.01)

(58) Field of Classification Search
CPC ................. H04M 3/56; H04M 3/5175; H04M 2203/655; H04M 3/5183; H04M 3/523
USPC ............ 379/202.01, 201.01, 265.05, 265.11, 379/265.12, 266.01, 266.02, 265.13, 379/265.06
See application file for complete search history.

(56) References Cited

U.S. PATENT DOCUMENTS

2016/0036973 A1* 2/2016 Harasimiuk ............ H04L 51/32
379/265.13

* cited by examiner

*Primary Examiner* — Thjuan K Addy

(57) ABSTRACT

A customer may be allowed to request a service and to very quickly be put in touch with a local service provider who can perform the requested service. The customer need not know the identity of the vendor beforehand, and the vendor may not know the identity of the customer before agreeing to discuss the service. Multiple local service providers may be contacted in parallel by a centralized server configured to connect the customer with the local service providers. The most qualified or most highly rated local service providers for the particular service may be identified and then contacted first. The customer may be put in touch with one or more vendors in a very short amount of time after submitting the request, e.g., within 90 seconds.

12 Claims, 24 Drawing Sheets

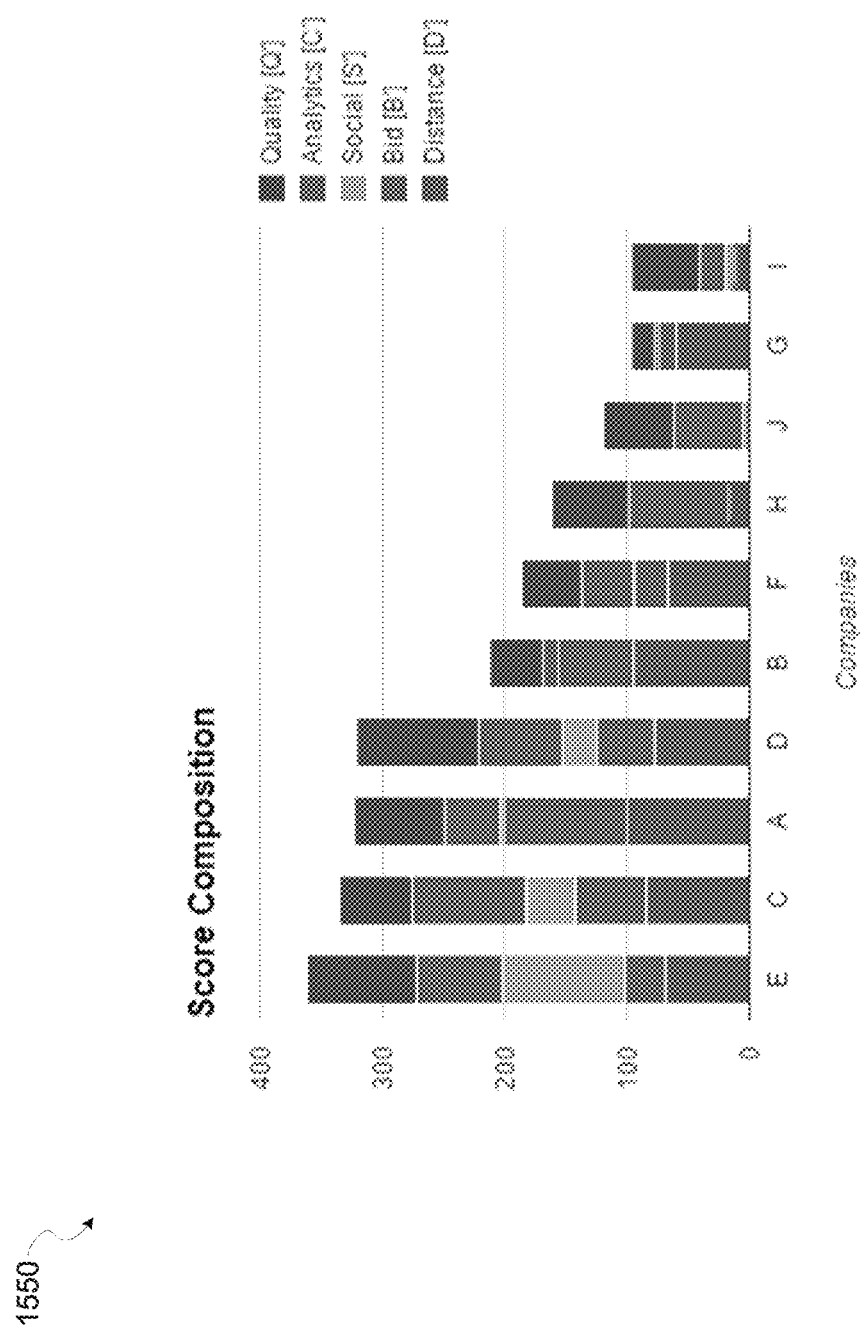

METHODS AND APPARATUSES FOR CONNECTING CONSUMERS TO LOCAL SERVICE PROVIDERS

CROSS REFERENCE TO RELATED APPLICATION

This application claims the benefit of U.S. Provisional Application 62/186,263, filed Jun. 29, 2015, and titled "METHODS AND APPARATUSES FOR CONNECTING CONSUMERS TO LOCAL SERVICE PROVIDERS," the disclosures of which are hereby incorporated herein in their entireties and for all purposes.

TECHNICAL FIELD

The subject matter disclosed herein generally relates to processing data. In some embodiments, the present disclosures relate to methods and apparatuses for connecting consumers to local service providers.

BACKGROUND

Advances in technology have allowed ordinary, everyday processes and jobs to be performed quicker and more efficiently. For example, information about local companies and businesses may be readily available by searching on the Internet. Some websites and companies perform services for rating the quality of local businesses and vendors. A potential customer may perform research on these local businesses and vendors before deciding which vendor to use for a particular service. However, typically when a customer directly calls a vendor, they are met with unanswered calls, inconvenient booking times and vendors that are unable to service their location or help them with the customer's specific job requirements. In other words, while more information may certainly be available due to advances in technology, a customer may still be left to perform certain fundamental actions that current advances in technology have not improved. It may be desirable therefore to develop methods and systems that can further improve a customer's ability to identify local businesses and vendors for their particular job requirements.

BRIEF DESCRIPTION OF THE DRAWINGS

Some embodiments are illustrated by way of example and not limitation in the figures of the accompanying drawings.

FIG. 15B is a graph showing example scores of ten sample vendors using an example algorithm, according to some embodiments.

DETAILED DESCRIPTION

Figure 1:
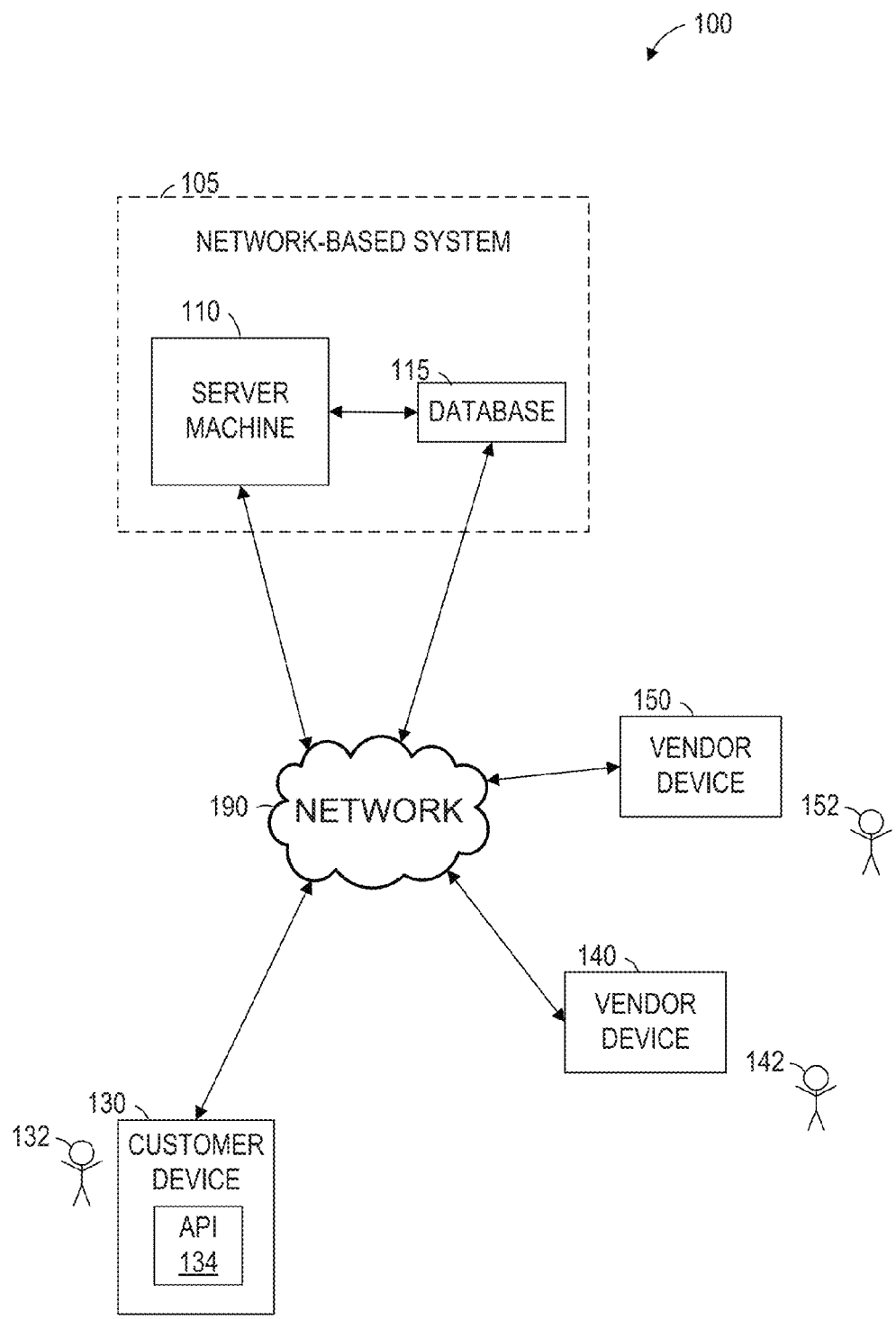
FIG. 1 is a network diagram illustrating an example network environment suitable for performing aspects of the present disclosure, according to some embodiments.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

Systems, methods, and apparatuses are presented for connecting consumers with local service providers. As used herein, a local service provider may refer to a business or person offering a service for performing a particular task in a community or to a customer, located in near proximity to the customer. Examples can include plumbers, air conditioning service repairman, veterinarians, lawyers, taxis, computer technicians, and the like. As used herein, a local service provider may also be referred to as a vendor.

Aspects of the present disclosure are presented for allowing a customer to identify a service she needs, based on a problem that needs to be fixed, an emergency, a brainstormed project, or for whatever other reason, and to very quickly be put in touch with a local service provider who can and has agreed to perform the service identified by the customer. The customer need not know the identity of the vendor beforehand, and the vendor may not know the identity of the customer before agreeing to perform the service, in some embodiments. In some embodiments, multiple local service providers may be contacted in parallel by a centralized server specially configured to connect the customer with the local service providers. In some embodiments, the most qualified or most highly rated local service providers for the particular service may be identified by the centralized server, and then contacted first. In some embodiments, the customer may be put in touch with one or more vendors in a very short amount of time after submitting the request for the service, e.g., within 90 seconds. Once in connection, the customer and the vendor may discuss more about the nature of the services desired and provided, and may also then negotiate and potentially settle on rates and compensation for the services.

The systems and methods presented herein may allow for a customer to very quickly be put in touch with practically any service desired that can be offered locally in his area. Aspects of the present disclosure therefore can reduce the amount of time used to identify multiple potential local vendors, determine the quality of service of each of the vendors, as well as quickly select vendors based on the customer service requirements as well as the customer's and the vendor's availability. In addition, the customer's identity may be held private from any of the vendors while the customer is in the process of being put in touch with any of the vendors. In general, aspects of the present disclosure can allow for the process of finding quality vendors for any and all particular services to be efficiently streamlined, reliable, quick, and safe from a privacy standpoint.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Referring to FIG. 1, a network diagram illustrating an example network environment 100 suitable for performing aspects of the present disclosure is shown, according to some embodiments. The example network environment 100 includes a server machine 110, a database 115, a customer device 130 for a customer 132, a first vendor device 140 for a first vendor 142, and a second vendor device 150 for a second vendor 152, all communicatively coupled to each other via a network 190. The server machine 110 may form all or part of a network-based system 105 (e.g., a cloud-based server system configured to provide one or more services to the customer device 130, and first and second vendor devices 140 and 150). The server machine 110, the customer device 130, the first vendor device 140, and the second vendor device 150, may each be implemented in a computer system, in whole or in part, as described below with respect to FIG. 23.

Also shown in FIG. 1 are the customer 132, the first vendor 142, and the second vendor 152. One or more of the customer 132 and the first and second vendors 142 and 152 may be a human user, a machine user (e.g., a computer configured by a software program to interact with the customer device 130), or any suitable combination thereof (e.g., a human assisted by a machine or a machine supervised by a human). The customer 132 may be associated with the customer device 130 and may be a user of the customer device 130. For example, the customer device 130 may be a desktop computer, a laptop computer, a vehicle computer, a tablet computer, a navigational device, a portable media device, a smartphone, a phone, or a wearable device (e.g., a smart watch or smart glasses) belonging to the first user 132. The customer device 130 may be configured to operate an application program interface (API) for contacting local vendors. The API may be configured to provide displays for customer interaction, such as the example displays in FIGS. 2-13, below. The API may also be configured to communicate with the network-based system 105. The first vendor 142 may be associated with the first vendor device 140, and the second vendor 152 may be associated with the second vendor device 150. As an example, the second vendor device 150 may be a desktop computer, a laptop computer, a vehicle computer, a tablet computer, a navigational device, a portable media device, a smartphone, a phone, or a wearable device (e.g., a smart watch or smart glasses) belonging to the second vendor 152.

Any of the machines, databases 115, customer device 130, or first or second vendor devices 140 or 150 shown in FIG. 1 may be implemented in a general-purpose computer modified (e.g., configured or programmed) by software (e.g., one or more software modules) to be a special-purpose computer to perform one or more of the functions described herein for that machine, database 115, or devices 130, 140 or 150. For example, a computer system able to implement any one or more of the methodologies described herein is discussed below with respect to FIG. 23. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the customer device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
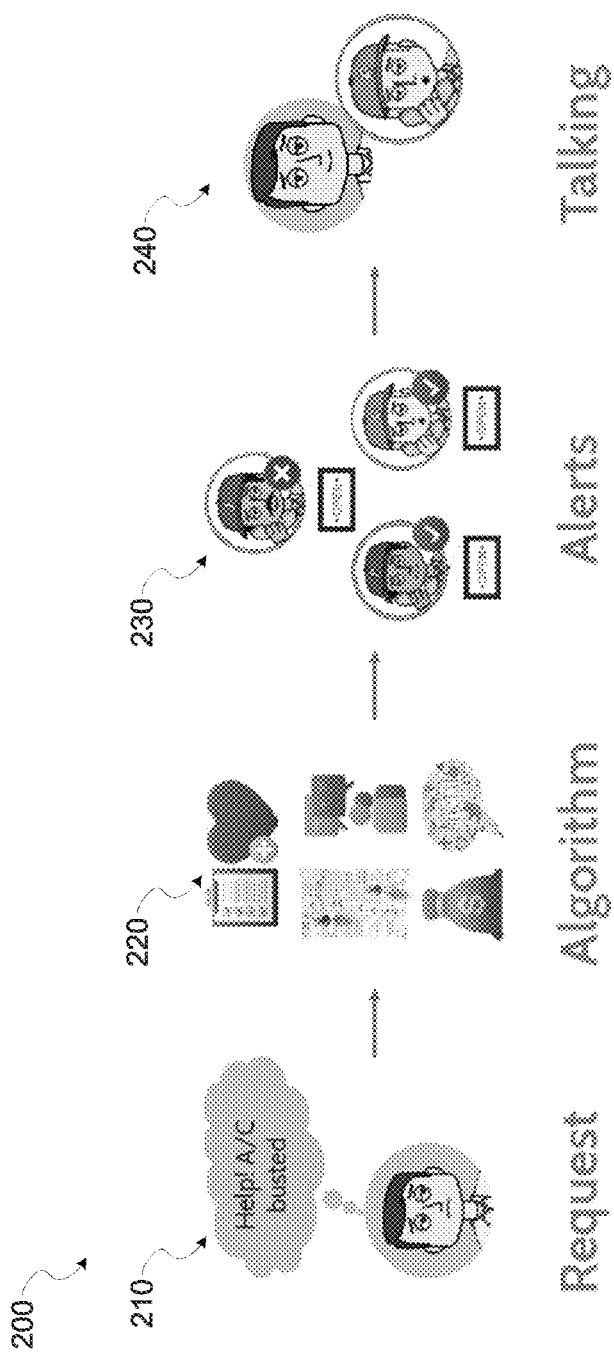
FIG. 2 is an illustration showing an example process flow for performing methods for connecting consumers with local service providers, according to some embodiments.

Referring to FIG. 2, illustration 200 shows an example process flow for performing methods for connecting consumers with local service providers, according to some embodiments. In this example, the process flow may start with a customer needing help with a certain service, such as fixing a broken air conditioner, at graphic 210. This customer may be an example of customer 132. The customer may submit a request to seek help for this particular type of service, the request being sent to a centralized server according to some embodiments. From there, at graphic 220, methods according to some embodiments may conduct one or more algorithms to identify local service providers near the customer who are known or believed to fix air conditioners. In some embodiments, the one or more algorithms may first identify the most highly rated local service providers who perform the service. In some embodiments, the one or more algorithms may compute a composite score that combines and/or balances multiple qualities about the local service providers, such as distance away from the customer, prices offered, ratings found online, social media activity, call analytics based on previous service requests etc., in order to determine one or more local service providers who are optimal to the customer and his request.

Having identified one or more local service providers capable of performing the service to fix the air conditioning, methods and systems of the present disclosure may then contact the one or more local service providers, in some cases immediately, as illustrated in graphic 230. In response, each of the contacted local service providers may have the option of answering the call or request, thereby allowing said local service provider to determine if he or she wishes to contact the customer to find out more information. Assuming the local service provider chooses to want to help the customer with his particular air conditioning problem, at graphic 240, methods and systems of the present disclosure may then directly connect the customer with the vendor, so that they can talk out further details, including rates, times, and any other conditions.

As can be seen in this example, in some embodiments, the customer initially need not know who are the vendors who can provide the service of fixing his air conditioner. The customer simply may submit a request about a problem, and then one or more vendors best suited to serve the customer are notified of the request and those vendors capable of servicing the problem will be connected with the customer.

Figure 3:
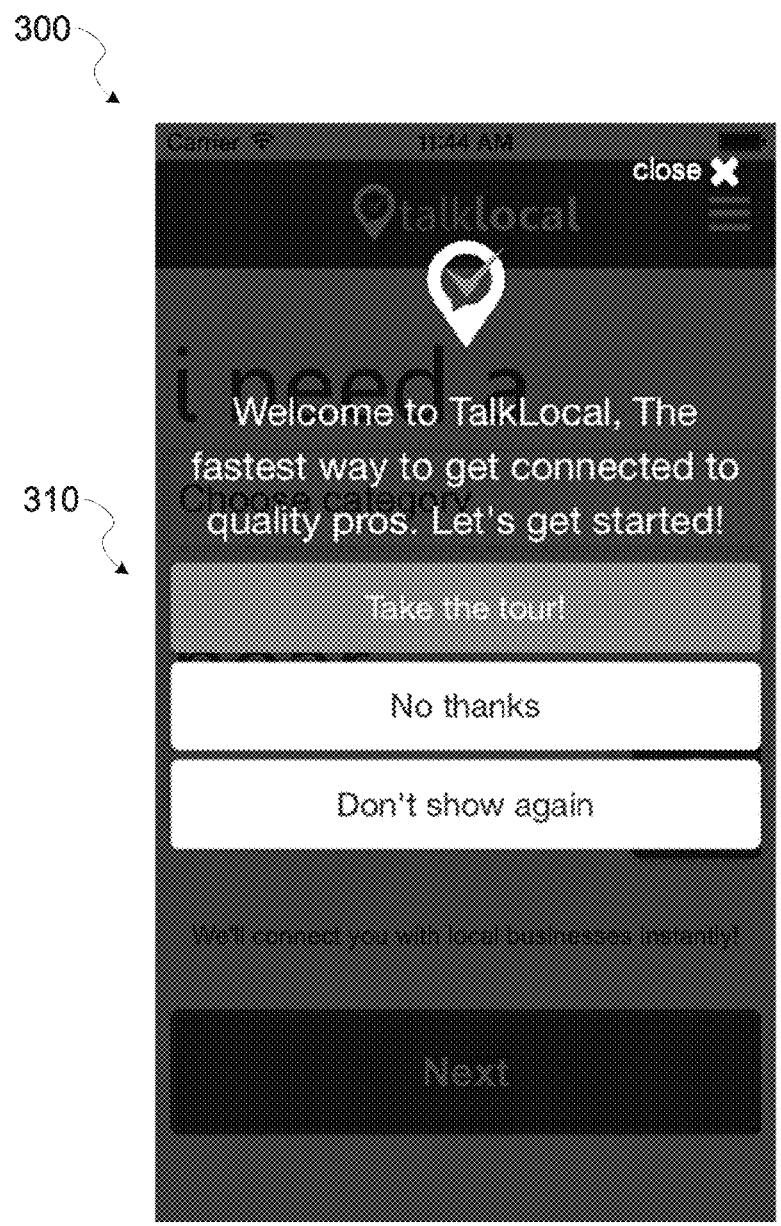
FIG. 3 is an illustration showing an example display for starting the request process for getting connected with local service providers, according to some embodiments.

Referring to FIG. 3, illustration 300 shows an example display for starting the request process for getting connected with local service providers, according to some embodiments. The example display in illustration 300 may be an example screenshot of an initial display on an application run on the customer's mobile device, such as customer device 130. Here for example, a user of the device 130, such as the customer 132, may begin using an application according to aspects of the present disclosure by taking a tour of the application via button 310. The illustration 300 may be an example display of a touchscreen, or non-touchscreen, and embodiments not so limited.

Figure 4:
FIG. 4 is an illustration showing an example display for initially submitting a request to get in contact with one or more local service providers, according to some embodiments.

Referring to FIG. 4, illustration 400 shows an example display for initially submitting a request to get in contact with one or more local service providers, according to some embodiments. In some embodiments, regardless of whether the customer interacted with the example display in illustration 300, the customer may first enter his contact information to begin the request process. Here, the customer may input his name, email address, and phone number in the input fields 410, in order to for the server to connect the customer and vendor to one another via the network. In some embodiments, the information supplied in input fields 410 may be transmitted to a server or other apparatus or system configured to identify and contact vendors suitable for satisfying the customer's request, such as network-based system 105 via server machine 110. The information supplied by the customer may be stored in database 115, for example. In some embodiments, the display of FIG. 4 appears only the first time the user fills in this information. Afterwards, this information may be saved and not displayed in subsequent requests submitted via the application. In some embodiments, the display of FIG. 4 appears after the display in FIG. 5, below, if there is no contact information previously stored in the application according to aspects of the present disclosure.

Figure 5:
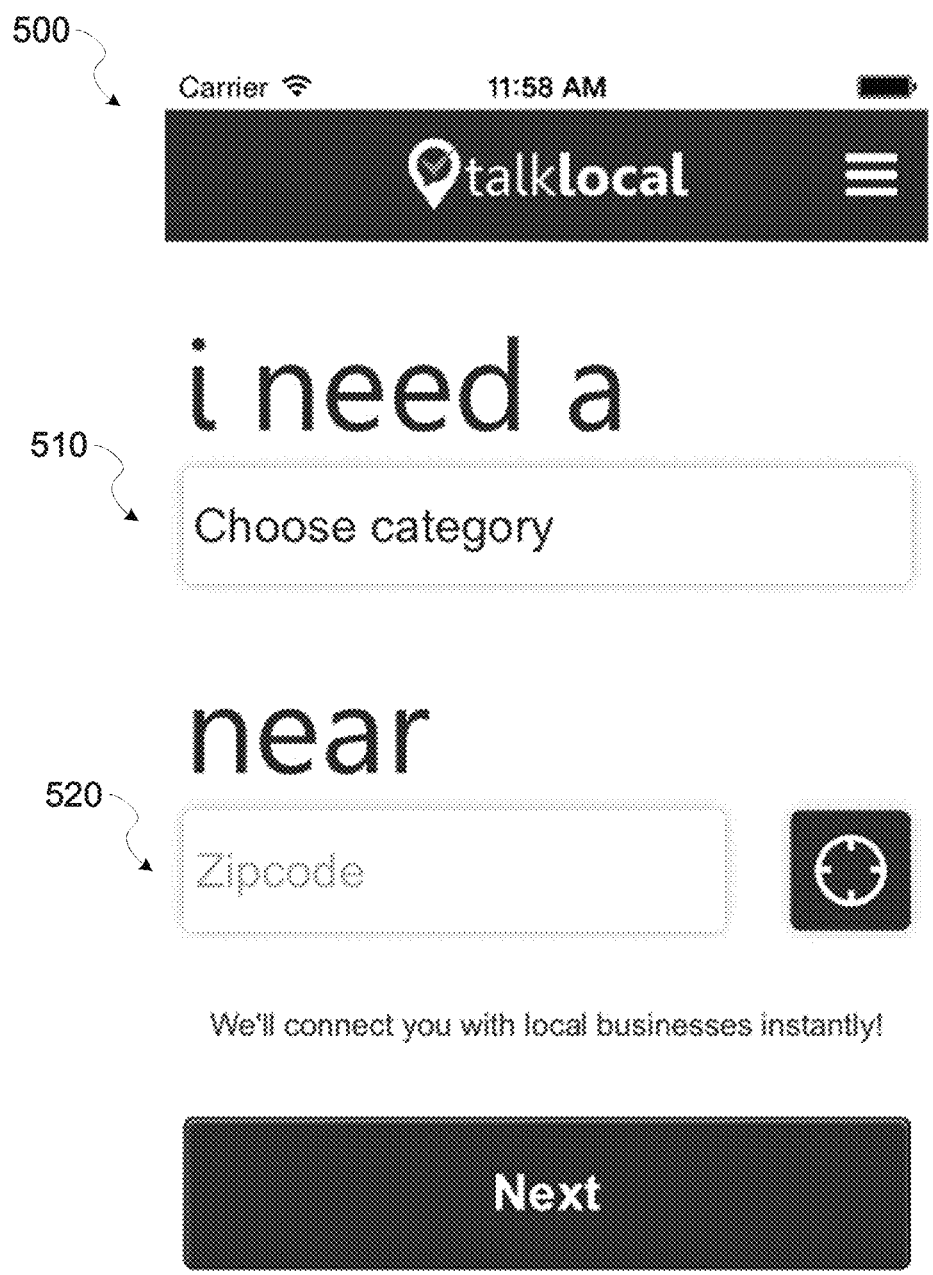
FIG. 5 is an illustration showing an example display for identifying the service requested by the customer, according to some embodiments.

Referring to FIG. 5, illustration 500 shows an example display for identifying the service requested by the customer, according to some embodiments. The example display in illustration 500 may be a display screen following the initial display in illustration 400, in some embodiments. Here, the customer can enter in the category for the type of service requested in input field 510. For example, the customer can choose a service from a category of services that can be scrolled through after tapping the input field 510. In other cases, the customer may be able to type in the type of category in input field 510. The customer may also be able to enter his ZIP Code in the input field 520, or utilize the devices built in functionality for determining location, via GPS or otherwise. In some embodiments, additional information can be entered, such as a residence address, or other more specific geographical information. Like before, the information supplied in the input fields 510 and 520 may be transmitted to a server or other apparatus or system configured to identify and contact local vendors to meet the customer's service needs.

Figure 6:
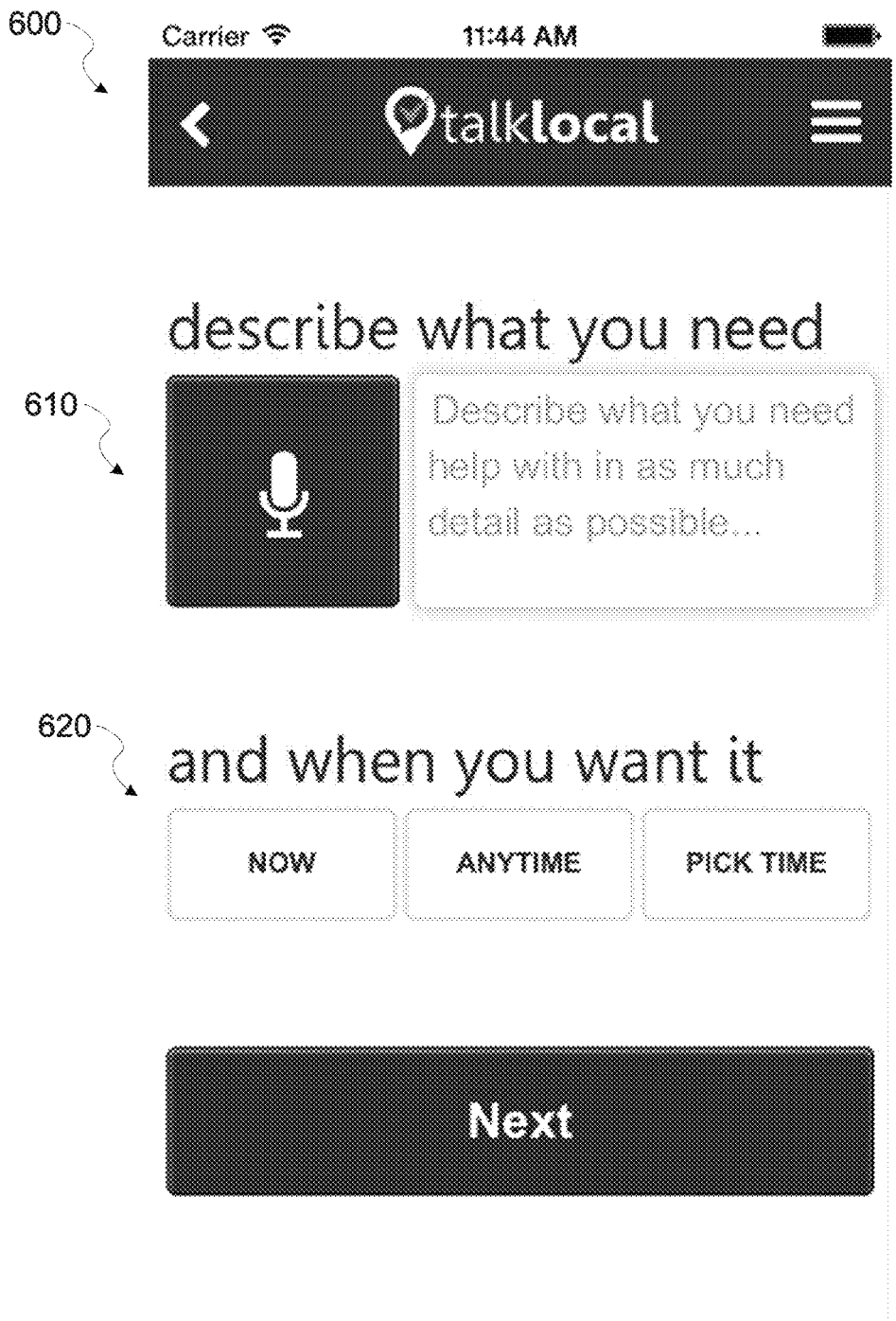
FIG. 6 is a display the customer may be taken to, following the information entered in the display of FIG. 5, in some embodiments.

Referring to FIG. 6, following the information entered in the display of illustration 500, the customer may be taken to a display as shown in illustration 600, in some embodiments. Here, the customer may be prompted to enter a description of the problem or service requested, at input 610. The customer may opt to type the description in the input field, or may alternatively describe the service requested in a voice recording. At input fields 620, the customer may enter a time. For when the service is requested. In this example, the customer can opt to enter requesting the service immediately, at any time, or can specify specific times. In some embodiments, the display in FIG. 4 appears after the display in FIG. 6.

Figure 7:
FIG. 7 is an example display for recording the message appearing if the customer opts to describe the problem via a voice recording, based on the example display in FIG. 6, according to some embodiments.

Referring to FIG. 7, if the customer opts to describe the problem via a voice recording, based on the example display in illustration 600, then an example display for recording the message may appear, as shown in illustration 700, according to some embodiments. Here, the customer may press the interaction button 710 to begin the voice recording. The customer may start describing the problem just by talking, similar to how somebody may leave a voice recording over the phone. The voice recording may be saved in the server or other apparatus or system, which can then be supplied to various vendors to enable them to determine the nature of the service requested and if they wish to supply that service.

Figure 8:
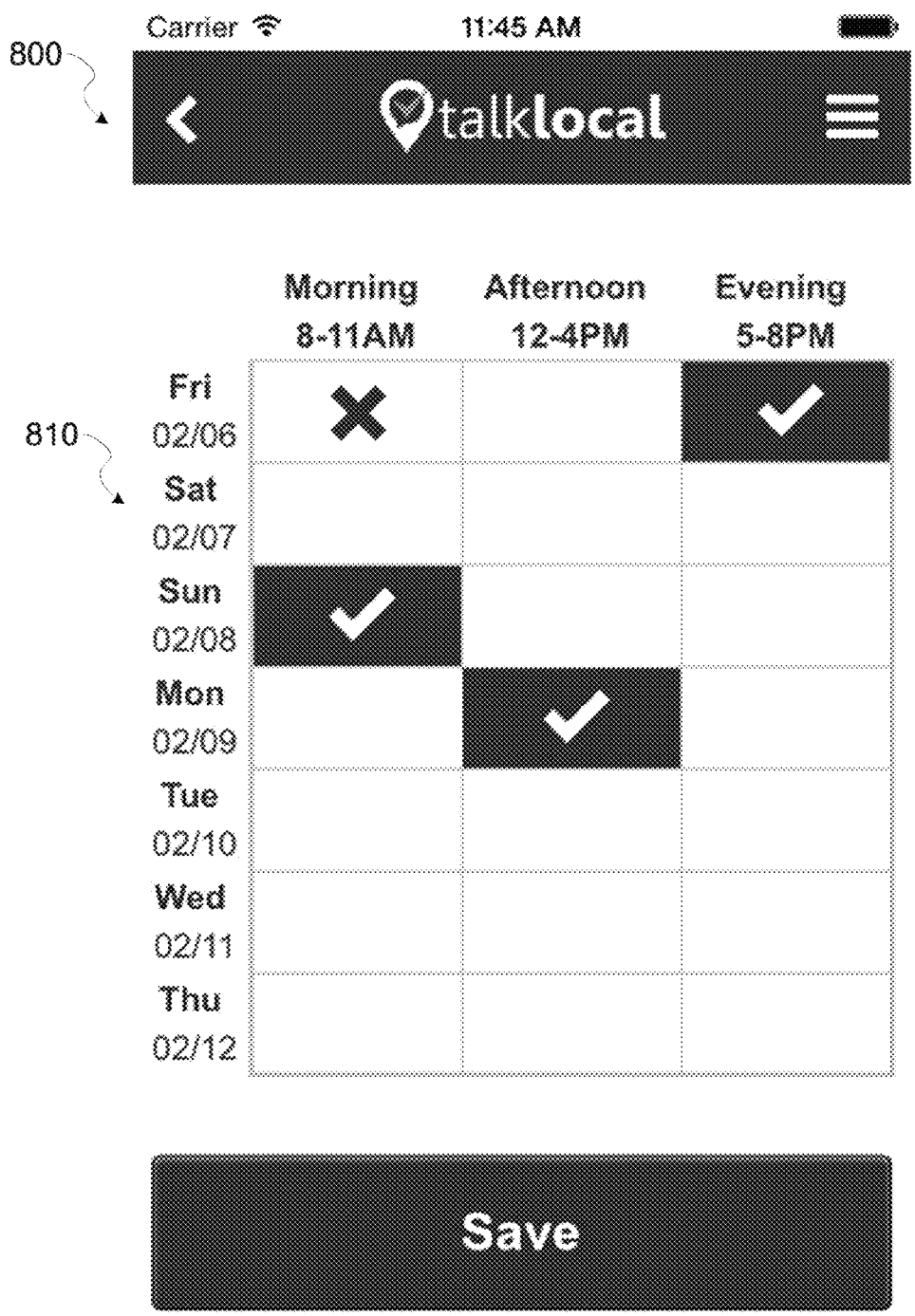
FIG. 8 is an example display for selecting specific times to provide the service that may appear, if the customer opts to specify specific times for when to expect the service to be provided, based on the example display in FIG. 6, according to some embodiments.

Referring to FIG. 8, if the customer opts to specify specific times for when to expect the service to be provided, based on the example display in illustration 600, then an example display for selecting specific times to provide the service may appear, as shown in illustration 800, according to some embodiments. Here, the customer may select one or more timeslots in the calendar 810 to indicate when he would like the service to be provided. For example, the customer in the illustration 800 has selected the times of the evening between 5 and 8 PM on Friday February 6, the morning between 8 and 11 AM on Sunday February 8, and the afternoon between 12 and 4 PM on Monday February 9. In some embodiments, the user may also be able to specify when he expressly would not like to have the service provided, such as in the morning between 8 and 11 AM on Friday February 6, as shown in the calendar 810. In some embodiments, the time ranges of the calendar 810 may be different or varied, for example having more time ranges within a day, finer time intervals, and the like. This information may then be communicated to all of the contacted vendors through the server configured to identify and contact the vendors, so that the vendors may have additional information for deciding whether to accept the request for service.

Figure 9:
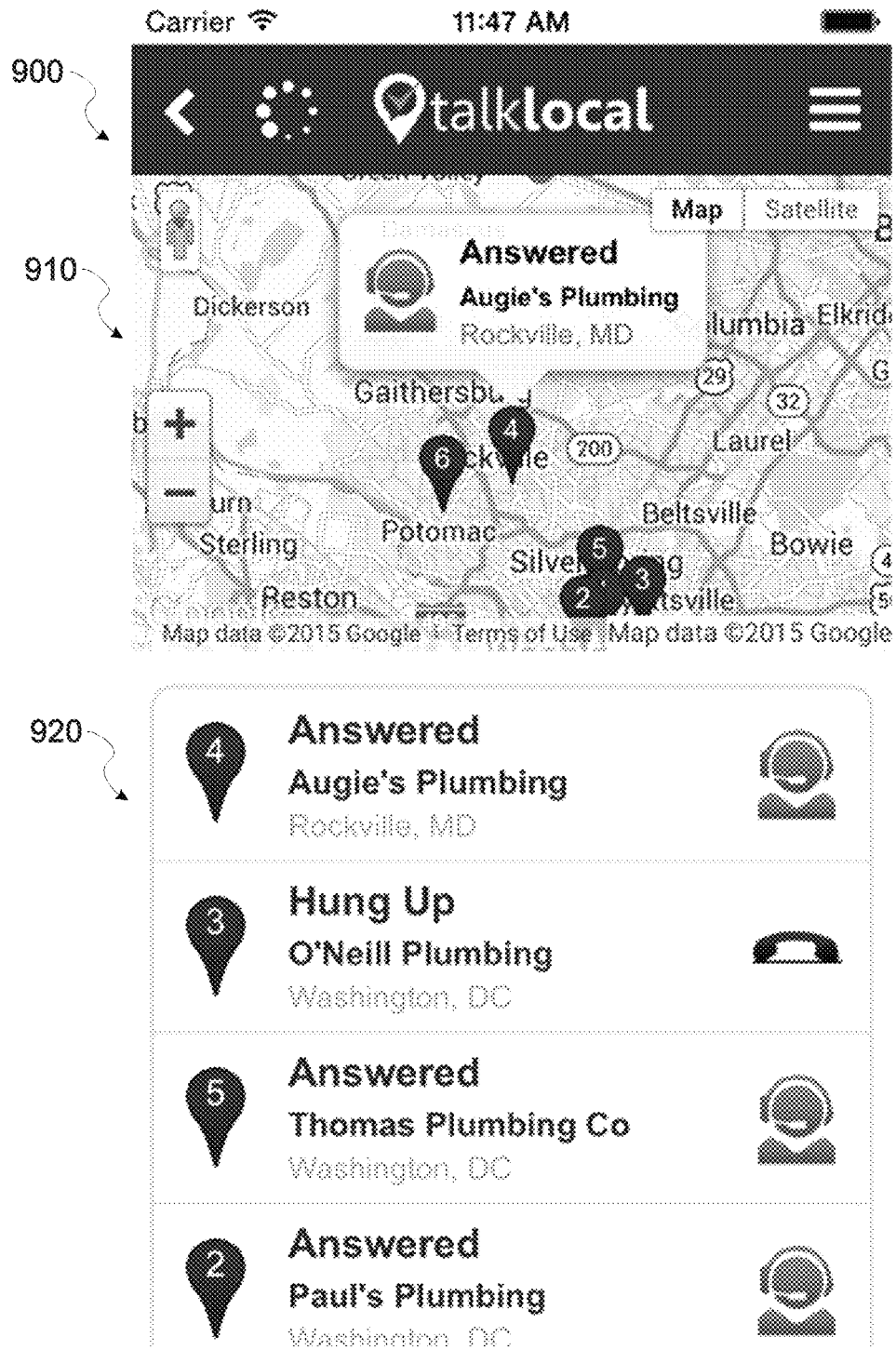
FIG. 9 is an illustration showing an example display of multiple vendors in the local area being contacted, based on the input information provided in the examples of FIGS. 5-8, according to some embodiments.

Referring to FIG. 9, illustration 900 shows an example display of multiple vendors in the local area being contacted, based on the input information provided in the examples of FIGS. 5-8, according to some embodiments. For example, a server or system configured to identify and contact local vendors, such as network-based system 105, may access as inputs the various information supplied by the customer. For example, the network-based system 105 may identify vendors in or near the ZIP Code provided by the customer in input field 520, filtered by vendors who are known to supply the services specified in input field 510, and in some cases filtered further by vendors who are known to supply the service at the time specified in the calendar 810. The network-based system 105 may perform additional processing via one or more algorithms for ranking the vendors in order to select a first set of optimal vendors to be contacted. Examples of additional algorithms may be described in further detail, below. Here, the example list of optimal vendors is shown in example list 920, and their locations are shown in the map 910. In some embodiments, the example display as shown in illustration 900 may be displayed in the customer's mobile device that was used to initiate the request, e.g. customer device 130.

Figure 10:
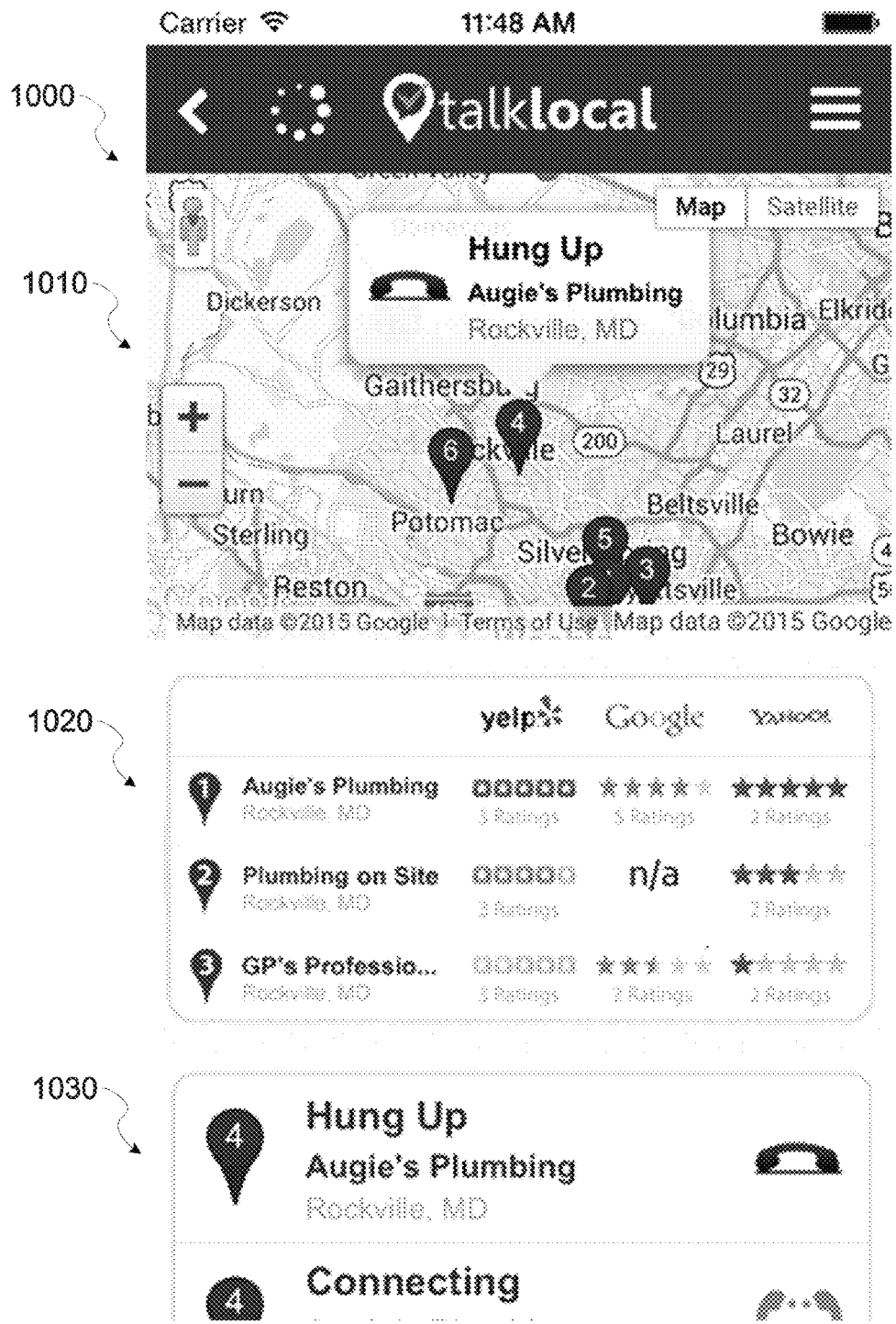
FIG. 10 is an illustration showing an example display of the vendors being contacted automatically through the server or system of aspects of the present disclosure.

Referring to FIG. 10, illustration 1000 shows an example display of the vendors being contacted automatically through the server or system of aspects of the present disclosure. For example, the map 1010 may show a live status of the vendors being contacted and how they are treating the calls, e.g., either by accepting the call, hanging up, or declining the call, etc. In addition, in some embodiments, a set of ratings may be displayed for each of the vendors being contacted, as shown in the ratings display 1020. This may allow a customer to have a quick sense of the quality of each of the vendors that they are connected to. Since the customer initially specified what his problem is and when his availability is to have the service provided, he may not know of the vendors who are intended to be contacted, so this can be a way for the customer to quickly see the quality of the vendors. The status display 1030 may also show the status of each of the vendors being contacted. In some embodiments, multiple vendors may be contacted in parallel through a novel calling wave method, described more below.

In some embodiments, when a vendor is contacted, the network-based system 105 may provide to the vendor an introductory message, either via text, email or via automated voice message, that a potential customer has requested services of the vendor. The vendor may be contacted at his phone or computer, such as first or second vendor devices 140 or 150. The network-based system 105 may also include in the text or voice message a broad category of the type of services requested, such as plumbing, based on the category chosen in input field 510. In addition, if the vendor decides to answer the call or the text, the customer's specific description of the service requested, location and availability may then be provided. For example, the vendor may then either hear the voice message 710 provided by the customer or may be shown via text the textual description entered in at input field 610.

In some embodiments, one or more of the contacted vendors may decide to accept the call to talk with the customer, based on the information provided. To accept the call, the vendor may respond back to the message either through voice or pressing a certain key on the number pad, in some embodiments. For example, the vendor may speak into the phone, "accept the call," or may press the number five on the touchpad. In some embodiments, multiple vendors may have decided to accept the call with the customer. In this scenario, the first company to accept would be connected and the other companies would receive notice that the customer is engaging with another company and they will be re-notified if the customer is still seeking help. The customer may then have the ability to select which vendor he would ask like to talk to, in some cases based on the ratings shown in the display 1020, and also in other cases based on the location of the vendor shown in the display 1010. The customer may then tap or select the vendor of his choosing. From here, the network-based system 105 may bridge the call from the vendor to the customer by putting the customer in contact with the vendor to a three-way call. In some embodiments, the conversation between the vendor and the customer may be recorded for quality assurance purposes and to gather additional statistics for later research, such as booking rate, answer rate, price quotes or other purposes known to those skilled in the art. Notice that up until this point, the vendor may not have known the identity of the customer, thereby ensuring privacy of the customer as much as possible. During the conversation, the vendor and the customer can negotiate a rate, confirm a specific time, and confirm more about the exact nature of the services. The vendor can conduct normal business for confirming the type of service that he may normally do with his regular business at this point. In some embodiments, the time from the customer submitting a request to the time that the customer is put in contact with a vendor may be very short, for example within 90 seconds.

Figure 11:
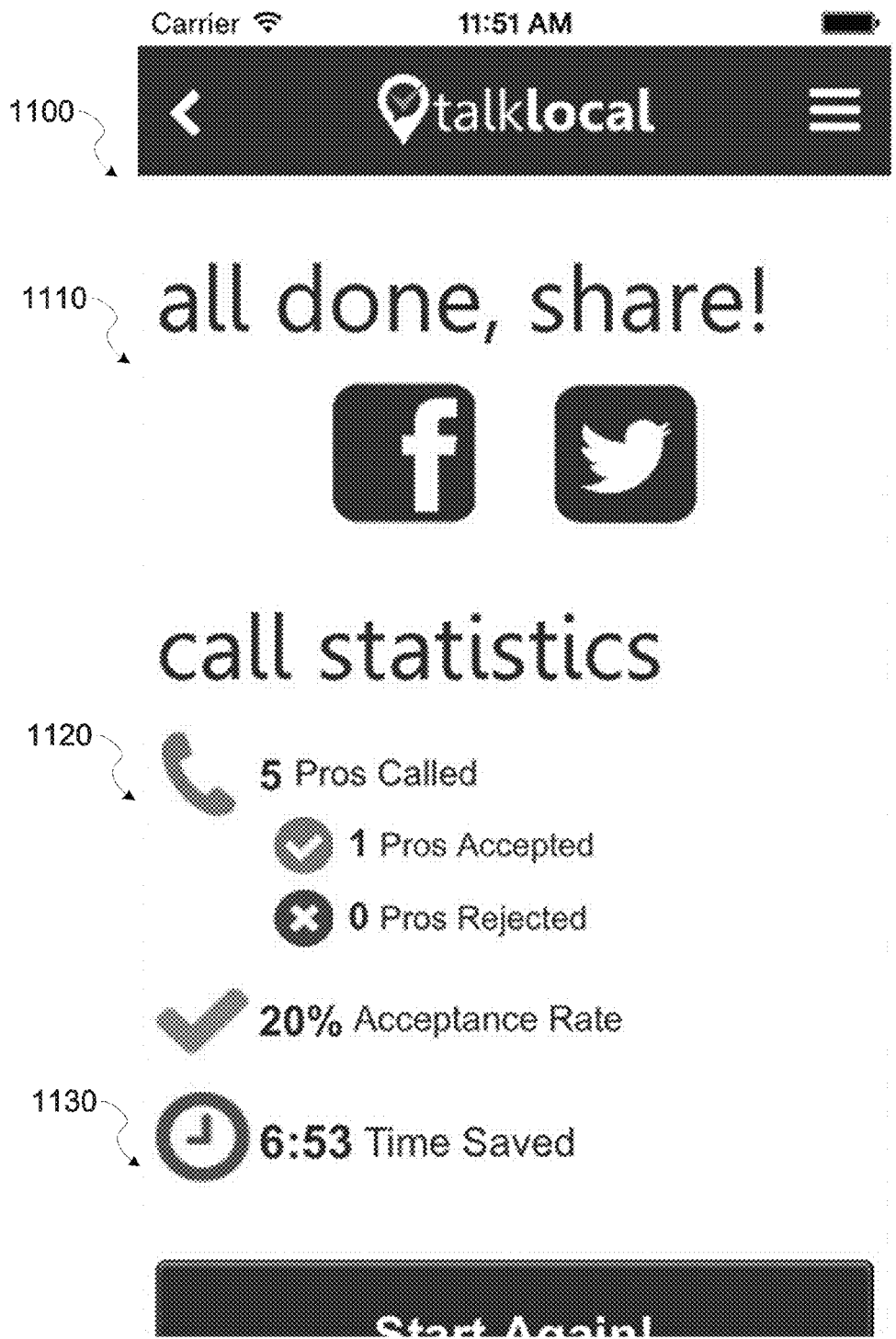
FIG. 11 is an illustration showing an example display of what the customer may see after the request process has been completed, according to some embodiments.

Referring to FIG. 11, illustration 1100 shows an example display of what the customer may see after the customer has finished talking with one or more vendors and has confirmed in appointments to have his service request addressed, according to some embodiments. For example, this finishing screen may allow the customer to share about his experience with using the methods and system according to the present disclosure, such as through Facebook® or Twitter®, in the share buttons 1110. Additionally, the customer may be shown the number of calls that were attempted while trying to connect the customer to one or more vendors as shown in the call statistics 1120. Here for example, the call statistics 1120 indicates that five professionals were called, while one professional had accepted the call, and zero have expressly rejected the call. The remaining four vendors may either have simply not answered the call or may not have answered the call before the first professional accepted the call. In some embodiments, an estimated figure of the amount of time saved may be shown in graphic 1130. The estimated amount of time saved may be based on an average calculation of how long it might take the customer to research, identify, and contact all of the vendors that were contacted on the customer's behalf through aspects of the present disclosure. In some example embodiments, the customer may also have the opportunity to provide feedback on the quality of his conversation with the vendor, and later the quality of the service provided by the vendor he accepted.

Figure 12:
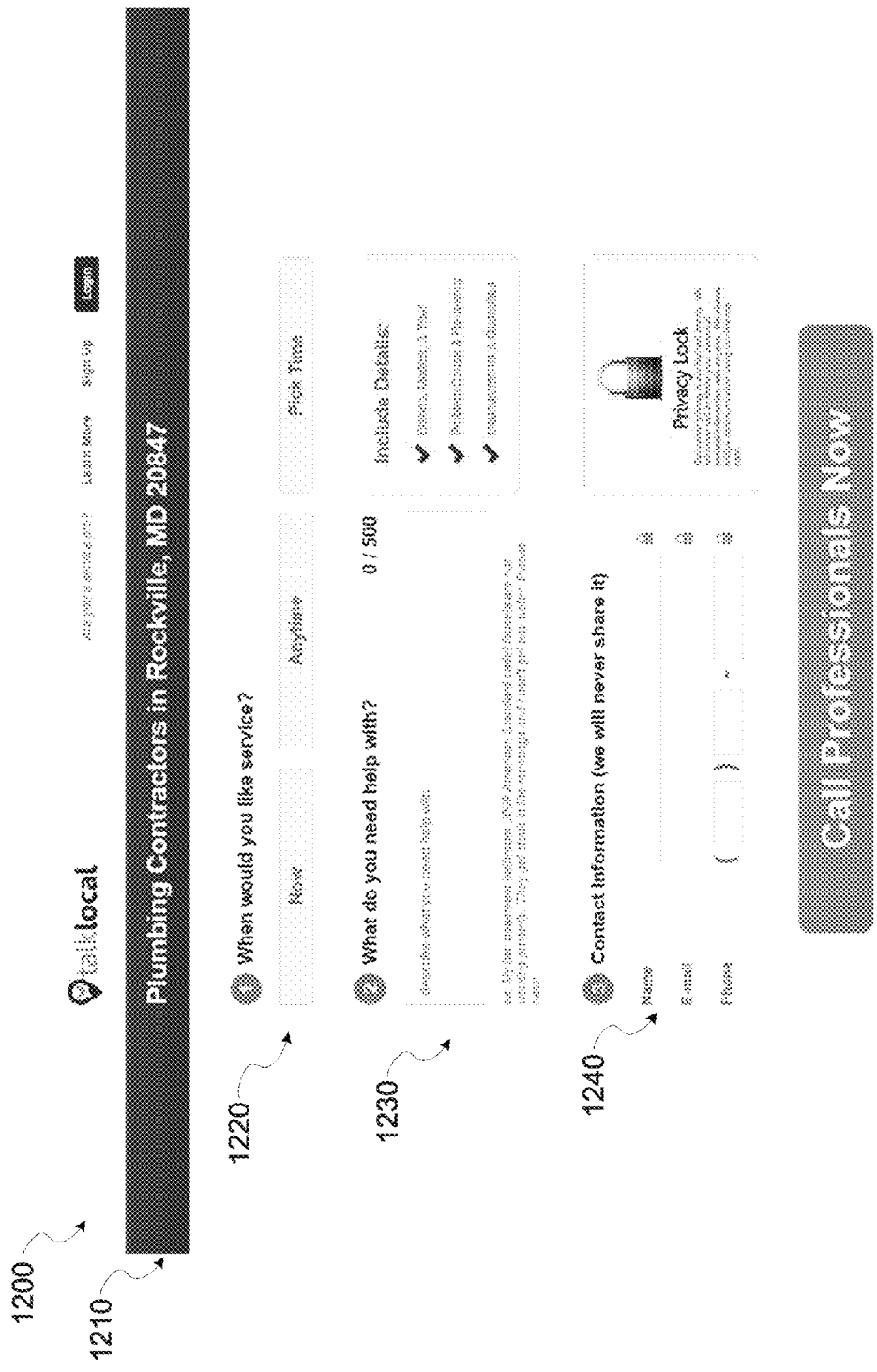
FIG. 12 is an illustration showing an example display of entering information for a service request using a non-mobile enabled website, according to some embodiments.

Referring to FIG. 12, illustration 1200 shows an example display for entering information for a service request using a large screen device, such as through a desktop computer or iPad browser, according to some embodiments. Here, the header 1210 may indicate the type of vendors requested in the local area specified by city or ZIP Code. The customer may be able to enter when he would like the service at input fields 1220, similar to the input fields 620. The customer may also be able to enter a more specific description of the nature of services requested in input field 1230. In some example embodiments, guidelines for the types of details requested may be display nearby. In addition, the customer may enter his contact information in the input fields 1240. With all of this information provided, the server or system, such as network-based system 105, may search for and identify a number of vendors who may optimally fit the customer's request.

Figure 13:
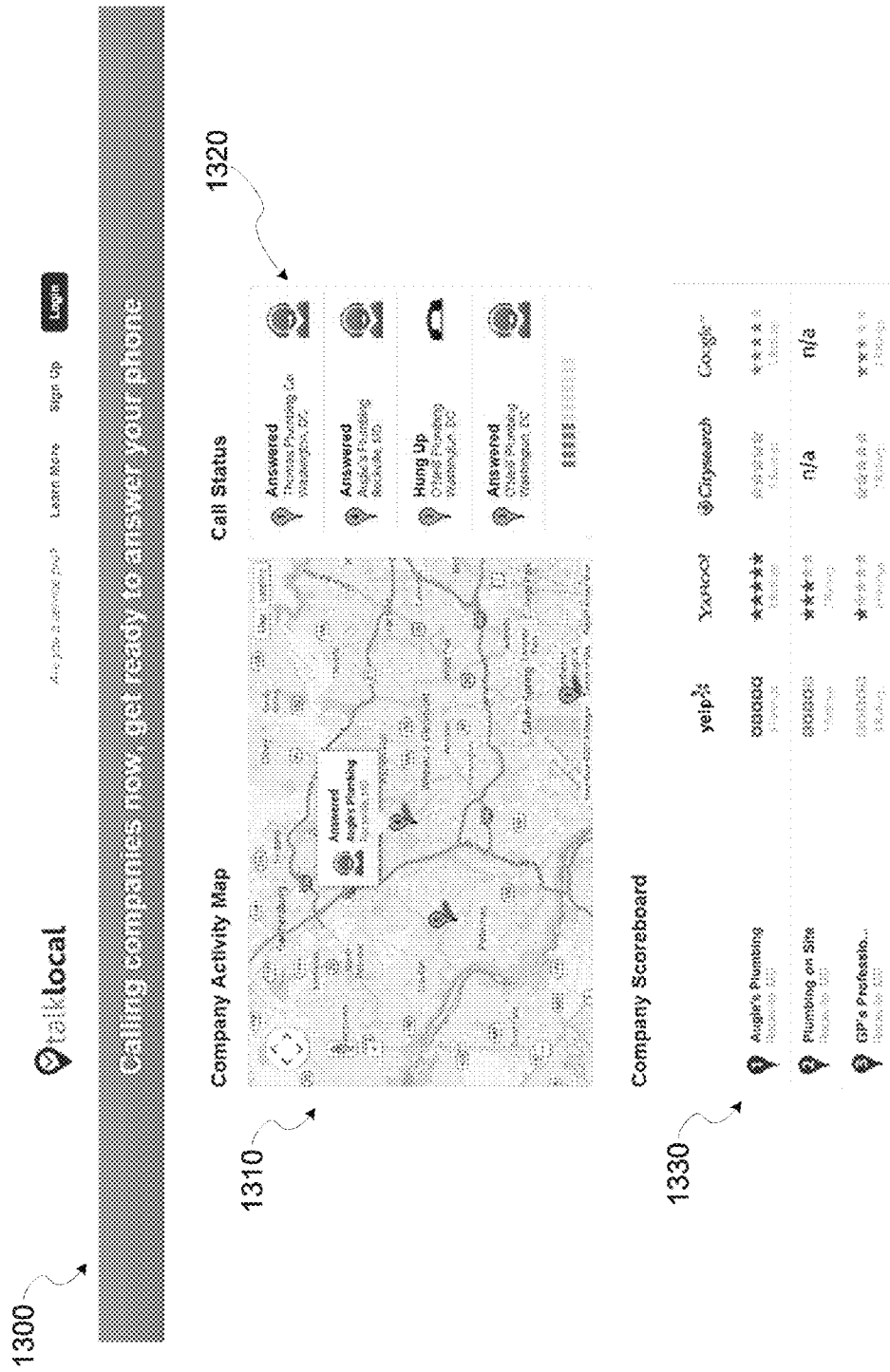
FIG. 13 is an illustration showing an example display of the various vendors being contacted based on the customer's inputted information from the example display in FIG. 12, according to some embodiments.

Referring to FIG. 13, illustration 1300 shows an example display of the various vendors being contacted based on the customer's inputted information from the example display in illustration 1200, according to some embodiments. This display may be similar to the information provided in the example displays and illustrations 900 and 1000. For example, a map showing the approximate locations of the vendors may be displayed in the map 1310, including the status of the responses by the vendors. Recent statuses of the vendors may be shown in the call status display 1320. In addition, in some embodiments, various readings of each of the vendors may be displayed in the company scoreboard 1330. Like before, once one or more vendors agrees to accept the request by the customer, the vendor may be put in contact with the customer through the network-based system 105, whereby the customer and the vendor may then negotiate further details to confirm providing the service.

Figure 14:
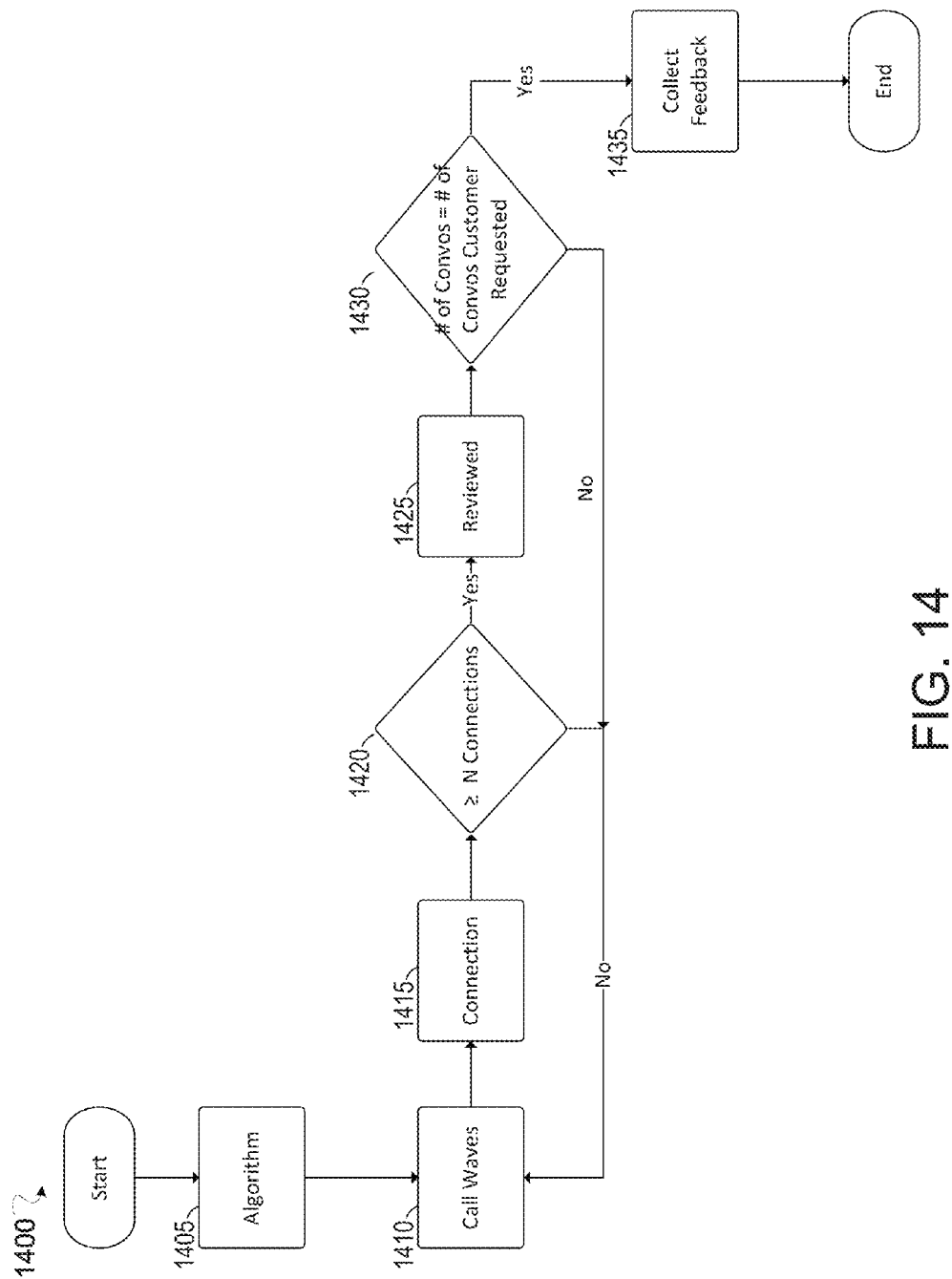
FIG. 14 is an example flowchart illustrating a schematic flow for connecting consumers with local service providers, according to some embodiments.

Referring to FIG. 14, example flowchart 1400 illustrates a schematic flow for connecting consumers with local service providers, e.g., vendors, according to some embodiments. The example flow described herein may be consistent with the example illustrations shown in FIGS. 2-13, for example. This example flow may be performed by the server or other system configured to identify and contact vendors on the customer's behalf, such as via network-based system 105. Here, the example flow begins with the customer submitting a request and providing his contact information and various specifics about the nature of his request, similar to the types of information provided in the previous figures. This information may be processed through one or more algorithms 1405 that are configured to identify the optimal vendors who may best be qualified to satisfy the customer's service request. Once one or more vendors are identified using the one or more algorithms 1405, at block 1410, the network-based system 105 may initiate multiple calls to multiple vendors in parallel, referred to herein as a call wave. For example, through the algorithm 1405, the top five most highly ranked vendors for the particular service may be identified, and these five vendors may be contacted in parallel with each other through the network-based system 105. This means that a subsequent vendor is contacted before the system is finished contacting a previous vendor. The nature of the calls may be similar to the contacts described in the previous figures, e.g. the descriptions in FIGS. 9-10.

In some embodiments, example pseudocode for conducting the call wave process starting in block 1410 is provided below:

L=List of Ranked Companies [array]
W=Size of wave (number of Companies to call in parallel)
T=Time duration used to launch the calls to next wave of Companies
If Request submitted:
Determine the first set of W companies to call in parallel (simultaneously) from L
Server initiates an outbound call to each company from a set of W companies from L
After T seconds, initial outbound call to each company in the next set of W companies from L
Repeat previous step until all companies from L have been called or Request reaches 1430 in FIG. 14

Still referring to FIG. 14, once the calls are made to one or more vendors, a connection may be made between the customer and one of the vendors, at block 1415. In some embodiments, this connection may be completed through a conference bridge provided by the centralized system of the present disclosures. This is because the centralized system may first receive a request from a customer, and then may initiate the call wave to the multiple vendors, but also would need to place an accepting merchant directly into a call with the customer. In some embodiments, this also allows the centralized server to record all communications with vendors, customers, and between vendors and customers for quality assurance and review purposes. By using the conference bridge, the customer is also allowed to remain anonymous until a merchant and customer are ready to interact.

In some embodiments, example pseudocode for completing a connection between a merchant/vendor and the customer is provided below:

If Request submitted:
- Determine the set of W companies to call in parallel (simultaneously) from L
- Server initiates an outbound call to each company from a set of W companies in L
- If any company from set W accepts initial call (call leg 1), launch a new call (call leg 2) to user indicating a match is found
- Upon user picking up (call leg 2), connect user (call leg 2) to company (call leg 1) essentially connecting leg 1 to leg 2
- Record all call legs Continuing on, the example flow may determine if multiple vendors have been connected to the customer and if that number exceeds a certain predefined threshold, at block 1420. If not enough vendors have been connected, then a second call wave of other vendors may be contacted, with the example flow circling back to block 1410. The second wave of vendors may be based on the next highest rated vendors previously computed via the one or more algorithms 1405. In general, in some embodiments, the centralized system may utilize a sequential dialing process that is configured to dial a new set of merchants in parallel every pre-determined period of time (e.g., every 60 seconds). However, if enough connections have been reached, then at block 1425, a review process may occur to evaluate the connections of the vendors. The review process, which may include human or automated methods, determines if the connections between the vendor and the consumer were indeed conversations—where the customer and company spoke about the requested service. Two examples of connections that are not conversations are when a vendor cannot service the customer's needs or the customer does not answer their phone and their voicemail answers.

At block 1430, the review process concludes with a check to verify if the number of conversations the customer had was what the customer wanted. In some embodiments, the customer had pre-notified the number they desired during the request submission process or by communicating with a customer service representative. The customer may engage in multiple conversations with multiple vendors in order to try to converge on an agreement to provide the service or obtain information about a service. In the event that the customer has not reached an agreement or is not satisfied with the information gathered, the example flow may determine if more vendors need to be contacted based on if the number of conversations is equal to or has exceeded the number of conversations the customer has requested. If it has not, then the example flow may cycle back to block 1410 where an additional round of call waves may be conducted. On the other hand, if the customer has conducted a number of conversations equal to the number of calls he has requested, or the customer is satisfied with at least one vendor, at block 1435, the customer may then have the opportunity to provide feedback on the quality of the calls. The network-based system 105 may be configured to collect this feedback for statistical and quality assurance purposes.

Referring to FIG. 15, example flowchart 1500 illustrates an example algorithm for generating a ranked list of vendors, according to some embodiments. The algorithm flowchart 1500 may provide further details to how the algorithm may perform in block 1405, for example. In some embodiments, the algorithm of example flowchart 1500 may be performed by a server or system configured to identify vendors and contact them based on the customer's request, such as network-based system 105. In some embodiments, the example flowchart 1500 may start with information provided by the customer requesting a service from a vendor having a particular set of skills, located in a particular general area. For example, the algorithm may start by accessing the information described in FIGS. 4-8.

With this information, at block 1505, the network-based system 105 may access companies in proximity to the customer's request, in some cases based on the address or ZIP Code the customer provided, for example. The network-based system 105 may have stored in memory, such as in database 115, a substantial list of companies capable of performing the service requested by the customer. In some embodiments, the processing at block 1505 may also include determining which companies can satisfy the customer's request. For example, the database 115 may also store metadata about each of the companies including tags for what kind of services the companies can provide. All companies who have a tag equal to or similar to the type of service requested by the customer may be included in this search, for example. In some embodiments, processing at block 1505 may also include computing a location score for each of the qualified companies, the location score contributing to an overall composite score for ranking each of the companies to determine which companies are best suited to meet the customer's request. In other cases, this location score may be computed in a later part of the algorithm, such as block 1525, described below.

In some embodiments, at block 1510, the network-based system 105 may access quality scores about the various companies as well. The quality scores may be based on ratings provided by previous customers, ratings researched online, e.g., Yelp® reviews, Yahoo® reviews, Google® reviews, etc., comments or ratings from the Better Business Bureau, and/or other factors similarly known to those with skill in the art. The data for developing these scores may be obtained through the use of API calls from the centralized server to the various companies' APIs. For example, the centralized system will make an API call to Yelp's API to determine what are the number of reviews for ABC Plumbing. In some embodiments, block 1510 may include computing an overall quality score for each of the companies based on one or more ratings and reviews discussed herein. In some embodiments, computing the overall quality score may be based on weighting the different ratings or reviews in particular ways. In other cases, this overall quality score may be computed in a later part of the algorithm, such as block 1525, described below.

In some embodiments, example pseudocode for accessing the quality scores is provided below:

P=list of companies in proximity (1505 in FIG. 15A)
For each company in P:
- Server initiates a function call to API [x] with given company information (name, phone number, address)
- Q=An array that temporarily stores quality data from API [x] for each given company In some embodiments, at block 1515, the network-based system 105 may access social media scores about the various companies as well Similar to block 1510, the data for developing these scores may be obtained through the use of API calls from the centralized server to the various companies' APIs. The social media scores may be based on a determination of how prevalent each company is across various social media. The social media score may be a secondary indicator for how professional and conscientious the company may be, for example, suggesting that the company is careful about providing quality service to its customers. The social media score may be based on a determination of the quality of a company's social media presence, and/or how prolific the company is on social media. Examples can include whether the company maintains a LinkedIn® profile, Facebook® profile, a Twitter® account, and/or degree of advertising in commercials, paper ads, and online advertisements. The social media score may also be based on the perceived quality or how updated the company's accounts are on any of these social media accounts. For example, the centralized system will make an API call to Facebook's API to determine what are the number of likes for ABC Plumbing. In some embodiments, block 1515 may include computing an overall social media score based on one or more of these factors. In other cases this overall social media score may be computed in a later part of the algorithm, such as block 1525, described below.

In some embodiments, example pseudocode for accessing the social media scores is provided below:
P=list of companies in proximity (1505 from FIG. 15A)
For each company in P:
    Server initiates a function call to API [x] with given company information (name, phone number, address)
    S=An array that temporarily stores social media data from API [x] for each given company In some embodiments, at block 1520, the network-based or centralized system 105 may access call analytics from previous calls answered by each of the companies when the companies were handling previous service requests from previous customers. This may be conducted by call analytics software stored in the network-based system, in some embodiments. The information contained in the recorded previous calls may provide extra data indicating the quality of customer service provided by the company, as well as how well-suited a company may be to provide the particular service requested by the present customer. For example, in some embodiments, a company may have expressed having a particular strength in performing a certain type of home improvement, such as performing home renovations in small spaces. The network-based system 105 may have gleamed this information from one or more previous conversations by the company after having analyzed a transcription of one or more previous phone conversations. This company may then get an additional bonus score for performing home renovations in small spaces. In other cases, computing a separate score based on the call analytics may be performed in a later part of the algorithm, such as block 1525, described below.

In some embodiments, example pseudocode for accessing the call analytics scores is provided below:
P=list of companies in proximity (1505 from FIG. 15A)
For each company in P:
    Server uses internal query X for a given company information to determine Call Analytics metric X for that company
    A=An array that temporarily stores call analytics data from API [x] for each given company In some embodiments, at block 1525, and overall composite score for each of the companies inconsideration may be computed. The composite score may be based on a combination of one or more scores determined at any and/or all of blocks 1505, 1510, 1515, and 1520. In some embodiments, each of the scores may be weighted equally, while in other cases the weights may be distributed differently, depending on the analyzed relative importance to each of the scores. In some embodiments, block 1525 may compute each of the individual scores based on the accessed data from each of blocks 1505, 1510, 1515, and 1520. Then, the overall composite score may be computed, as discussed above.

In some embodiments, at block 1530, the network-based system 105 may determine whether the companies are paying companies to the overall system according to aspects of the present disclosure. In some embodiments, companies who pay, such as a subscription fee, to the network-based system 105 may be afforded a higher weight or an additional score when determining which companies should be called first to satisfy the customer's request. In some cases, multiple companies may pay the system of aspects of the present disclosure, and in which case the company is may be afforded the same additional weight or extra score, while in other cases each of the companies may have placed a bid to the system. The bids placed may be some dollar amount, placed independently of each other company.

In some embodiments, at block 1535, if it is determined that a company has paid the system, then the subscription fee or the bid may be accessed. At block 1540, the amount of the subscription fee or bid may correspond to a proportionally higher weight or score being added to the overall score computed in block 1525. In some embodiments, the weights may have a multiplier effect to the computed score, while in other cases the weight may have an additive effect.

In some embodiments, at block 1545, each of the companies inconsideration, regardless of whether they are determined to be a paying company or not, are ranked against each other based on their final composite score. From here, the first several companies with the highest scores may be contacted first to see if they would like to satisfy the customer's request. Companies rank lower in the list would be contacted thereafter later, assuming the request for the service had not yet been met by the higher ranked companies.

Example Implementation of Algorithm

Figure 15A:
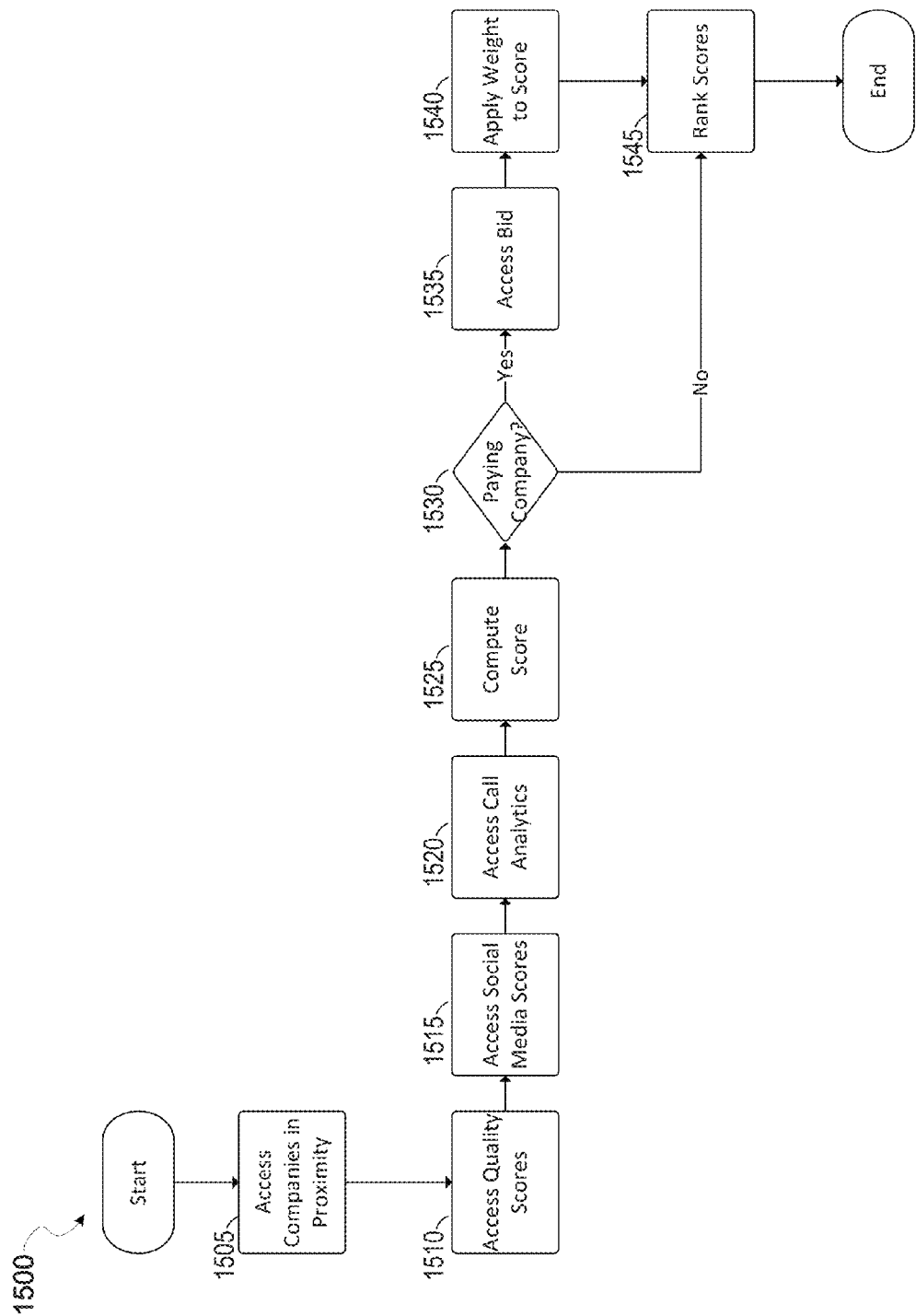
FIG. 15A is a flowchart illustrating an example algorithm for generating a ranked list of vendors, according to some embodiments.

The following is one example implementation of the described algorithm in FIG. 15A. It is noted that the algorithm may be modified to suit the needs of various partners and other contractors, such as looking at Quality data from a different mix of quality sources. In the following example, five aspects for determining the quality of vendors are weighed equally against one another.

Here, the example ranking algorithm calculates the five aspects of each company:

Distance [D']—the distance between the consumer and the companies, with company service area preferences considered Bid [B']—how much the businesses are willing to pay per conversation with the consumer to the system Social [S']—company reach and social engagement on, e.g., Twitter®, Facebook®, LinkedIn® and others Call Analytics [C']—look at indicators of company responsiveness and ability for the company to service the consumer. Supplemented by information on hours of operation and service preferences.

Quality [Q']—the quality of the job they do, mix of ratings (star level) and reviews (quantity)—through APIs from online review websites Thus, a call rank score can be defined by the following equation:

$$\text{Call Rank Score} = D'(w) + B'(w) + S'(w) + C'(w) + Q'(w), \quad (1)$$

Where weight=w=0.2.

Feature scaling may be used to normalize data. It is provided here for reference:

$$X' = a + (X-A)(b-a) \div (B-A), \quad (2)$$

Where a=minimum for the new scale, b=maximum for the new scale, A=smallest value in data set, and B=largest value in data set.

Distance Score

Ideally a consumer wants to be connected to a nearby company. Distances between consumers and companies vary quite a bit depending on the area. There may be 60 companies within 5 miles of the consumer or 5 companies 60 miles away. The data is normalized to adjust the value of the scale so that the closest company gets the maximum score and the furthest gets the smallest. For this particular normalization, the largest value is 60 miles (A) and the smallest value is 2 miles (B). This does not follow convention because the closest companies should get the largest score and the furthest company should get the smallest score. Thus, the distance score D' may be computed as:

$$D' = 100 + (D-60)(100-0) \div (2-60) \quad (3)$$

TABLE 1

Table of distance scores for Companies A-J

| Company | Distance (mi) [D] | Distance Score [D'] |
|---|---|---|
| A | 2 | 100.00 |
| B | 5 | 94.83 |
| C | 11 | 84.48 |
| D | 15 | 77.59 |
| E | 20 | 68.97 |
| F | 21 | 67.24 |
| G | 25 | 60.34 |
| H | 51 | 15.52 |
| I | 54 | 10.34 |
| J | 60 | 0.00 |

TABLE 2

Table of bid scores for Companies A-J

| Company | Bid [B] | Bid Score [B'] |
|---|---|---|
| A | $44 | 100.00 |
| B | $30 | 61.11 |
| C | $29 | 58.33 |
| D | $25 | 47.22 |
| E | $20 | 33.33 |
| F | $17 | 25.00 |
| G | $13 | 13.89 |
| H | $ 9 | 2.78 |
| I | $ 9 | 2.78 |
| J | $ 8 | 0.00 |

Social Score

Social score can include many factors, each of which demonstrates a business' ability to communicate with their customers. Many sources are examined, such as Linkedin®, Facebook® and Twitter®. Each one of these platforms has an "Audience" aspect and an "Engagement" aspect. Audience represents how many people that company can potentially reach, such as followers and connections. Engagement represents that company's ability to communicate with its audience. Examples can include posts, shares, comments, retweets, favorites, and endorsements. In this example, only the Audience and Engagement of both Facebook® and Twitter® are examined. Each is normalized individually and then the subscores are totaled to achieve the Social score. In this example, the Audience aspect is weighted slightly higher than engagement since establishing an Audience is often a precursor to engagement, though they are strongly correlated. This is achieved in this example by normalizing to 30 for Fa' and Ta'; to 20 for Fe' and Te'. For those companies that do not have data they are given no points. Thus, the social score S' may be computed as follows:

$$S' = Fa' + Fe' + Ta' + Te' \quad (5)$$

TABLE 3

Table of Social Score for Companies A-J

| Company | Facebook Audience (Likes) [Fa] | [Fa'] | Facebook Engagement (Posts, Shares) [Fe] | [Fe'] | Twitter Audience (Followers) [Ta] | [Ta'] | Twitter Engagement (Tweets, Retweets) [Te] | [Te'] | Social Score [S'] |
|---|---|---|---|---|---|---|---|---|---|
| A | 26 | 1.02 | 10 | 2.02 | 0 (N/A) | 0.00 | 0 (N/A) | 0.00 | 3.04 |
| B | 1 | 0.04 | 0 (N/A) | 0.00 | 0 (N/A) | 0.00 | N/A | 0.00 | 0.04 |
| C | 350 | 13.73 | 11 | 2.22 | 78 | 21.47 | 4 | 2.86 | 40.27 |
| D | 201 | 7.88 | 32 | 6.46 | 47 | 12.94 | 0 (N/A) | 0.00 | 27.28 |
| E | 765 | 30.00 | 99 | 20.00 | 109 | 30.00 | 28 | 20.00 | 100.00 |
| F | 6 | 0.24 | 1 | 0.20 | 1 | 0.28 | 2 | 1.43 | 2.14 |
| G | 0 (N/A) | 0.00 | 0 (N/A) | 0.00 | 0 (N/A) | 0.00 | 0 (N/A) | 0.00 | 0.00 |
| H | 0 (N/A) | 0.00 | 0 (N/A) | 0.00 | 0 (N/A) | 0.00 | 0 (N/A) | 0.00 | 0.00 |
| I | 21 | 0.82 | 4 | 0.81 | 15 | 4.13 | 1 | 0.71 | 6.47 |
| J | 6 | 0.24 | 2 | 0.40 | 12 | 3.30 | 3 | 2.14 | 6.08 |

Bid Score

In this example, bid is treated the same way as distance. In other iterations of this score, the top subset (e.g., 25% of the top bids) could be given an equal score to diminish the ability of a company to "buy its way to the top." Here, the bid score may be computed as:

$$B' = 100 + (B-8)(100-0) \div (44-8) \quad (4)$$

Call Analytics Score

The system according to aspects of the present disclosure may measure the answer rate and booking rate among other signals of customer service and quality. For this example, each signal is normalized separately and then added to achieve the Call Analytics score. In the example, the Booking rate is weighed more than the Answer rate, as it is reasoned that it's a better indicator of finding the consumer a match. This is achieved by normalizing to 40 for A' and 60 for B'. The equation for the call analytics score can thus be described as:

$$C' = A' + B' \quad (6)$$

Quality Score

To compute the quality score, one or several review sites may be used, depending on access to the API, the stakeholders, and business requirements. In the example below, a relatively simple approach is taken to determining a company's quality. For example, the weighted average may be used. The weighted average may be calculated by the following equations:

$$L = X2 + Y2 \quad (7)$$

$$Q = ((X1*X2) + (Y1*Y2)) \div (L) \quad (8)$$

The weighted average may be normalized to obtain Q'. Companies without a score are granted a Q of 3 so that they are not penalized for not having any reviews.

TABLE 4

Table of Quality Score for Companies A-J

| Company | Site 1 Rating (Stars) [X1] | Site 1 Reviews (Quantity) [X2] | Site 2 Rating (Stars) [Y1] | Site 2 Reviews (Quantity) [Y2] | Total Reviews [L] | Weighted Average [Q] | Quality Score [Q'] |
|---|---|---|---|---|---|---|---|
| A | 3.5 | 14 | 4 | 5 | 19 | 3.63 | 72.63 |
| B | 2 | 12 | 3 | 3 | 15 | 2.20 | 44.00 |
| C | 0 (N/A) | 0 (N/A) | 0 (N/A) | 0 (N/A) | 0 (N/A) | 3.00 | 60.00 |
| D | 5 | 7 | 5 | 12 | 19 | 5.00 | 100.00 |
| E | 4.5 | 17 | 4.5 | 98 | 115 | 4.50 | 90.00 |
| F | 2.5 | 2 | 0 (N/A) | 0 (N/A) | 2 | 2.50 | 50.00 |
| G | 1 | 6 | 1 | 9 | 15 | 1.00 | 20.00 |
| H | 4 | 15 | 3 | 57 | 72 | 3.21 | 64.17 |
| I | 2.5 | 4 | 3 | 8 | 12 | 2.83 | 56.67 |
| J | 2.5 | 3 | 3 | 13 | 16 | 2.91 | 58.13 |

It should be noted that in this example L is used to calculate the weighted average, while in other iterations of the Quality Score L is even more heavily involved as it indicates the legitimacy of a particular score. The more reviews, the more the star rating can be "believed" to be true.

Call Rank Total Score

Continuing with this example, the sum of each of the 5 scores is taken and the totals are then ranked. Again in the example, each piece is equally weighed against one another for simplicity, although in other cases, weights may be applied to each of the types of scores. FIG. 15B shows the results of the composite score of this example.

$$\text{Call Rank Score} = D'(w) + B'(w) + S'(w) + C'(w) + Q'(w) \quad (9)$$

weight=w=0.2

TABLE 5

Table of Total Call Rank Score for Companies A-J (see FIG. 15B)

| Company | Distance [D'] | Bid [B'] | Social [S'] | Analytics [C'] | Quality [Q'] | Score |
|---|---|---|---|---|---|---|
| E | 68.97 | 33.33 | 100.00 | 68.86 | 90.00 | 72.23 |
| C | 84.48 | 58.33 | 40.27 | 91.67 | 60.00 | 66.95 |
| A | 100.00 | 100.00 | 3.04 | 46.40 | 72.63 | 64.41 |
| D | 77.59 | 47.22 | 27.28 | 68.51 | 100.00 | 64.12 |
| B | 94.83 | 61.11 | 0.04 | 11.75 | 44.00 | 42.35 |
| F | 67.24 | 25.00 | 2.14 | 42.02 | 50.00 | 37.28 |
| H | 15.52 | 2.78 | 0.00 | 79.65 | 64.17 | 32.42 |
| J | 0.00 | 0.00 | 6.08 | 55.09 | 58.13 | 23.86 |
| G | 60.34 | 13.89 | 0.00 | 2.81 | 20.00 | 19.41 |
| I | 10.34 | 2.78 | 6.47 | 20.00 | 56.67 | 19.25 |

Figure 16:
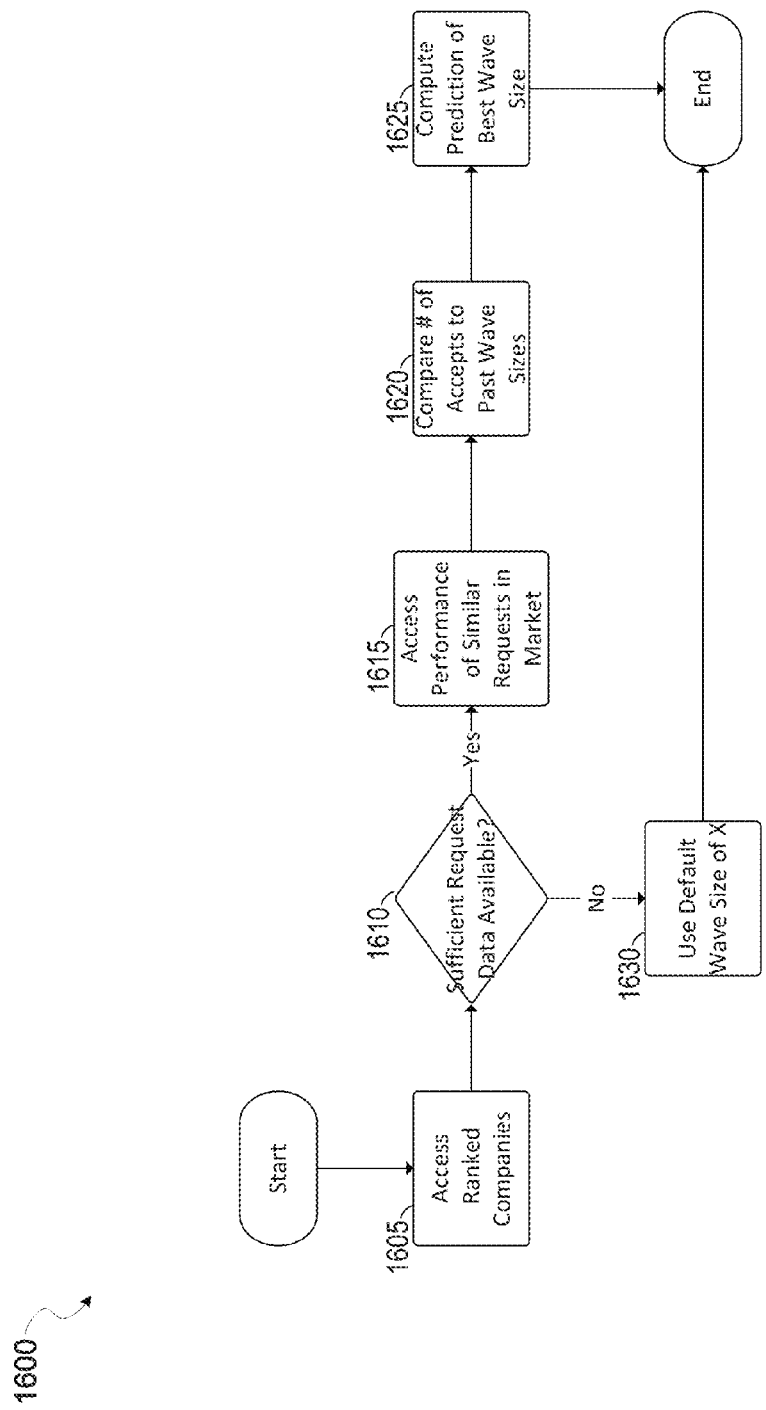
FIG. 16 is a flowchart illustrating an example methodology for preparing and conducting a call wave, according to some embodiments.

Referring to FIG. 16, flowchart 1600 illustrates an example methodology for preparing and conducting a call wave, according to some embodiments. Flowchart 1600 may be an example of further details for performing the call wave described in block 1410, in some embodiments. Flowchart 1600 may be performed by a server or system configured to identify and contact various vendors to satisfy a customer's request, such as network-based system 105. Here, at block 1605, the network-based system 105 may access the list of ranked companies previously determined in the algorithm 1405, such as through the ranked list generated at block 1545 in FIG. 15.

At block 1610, the network-based system may first determine whether there is sufficient request data available, based on the customer's request. Request data can include the history of requests in the related geographic region and related category (e.g., plumbing, gardening, etc.). Determining whether there is sufficient data may depend on a number of factors, which may vary. For example, it may be sufficient for there to be 10 related requests, or 20, or just 3, and may be dependent on the density of the population, the category of the request, and other factors. If there is not sufficient data, in some embodiments, at block 1630, the network-based system may send out a default number of calls to a first set of companies ordered by the ranked list. For example, companies in the ranked list. The network-based system 105 may be configured to send out the first five calls in parallel, meaning that the first five calls to the companies will be made simultaneously or near simultaneously, in the sense that a first call will be initiated before a second call is initiated, but all of the five calls will co-occur. This is performed using special processing of the network-based system, according to some embodiments.

At block 1615, if it is determined that there is sufficient request data available, then the network-based system 105 may access performance of similar requests in the market. Accessing this kind of data may be useful for determining an optimal number of calls to be made in each call wave. The data pertaining to performance of similar requests in the market may include statistics on how many calls were made in previous requests in a similar market, e.g., similar location, similar type of request, similar time of the request, etc. At block 1620, the network-based system 105 may compare statistics from the previous requests in the similar markets to the present request. For example, the number of acceptances by contacted vendors in call waves of varying sizes for a request in a similar market may be compared to the present request. For example, in previous call waves for a request in a similar location for the exact same service, the network-based system 105 may have determined that a call wave of size 5 resulted in one accepted vendor, while a call wave of size 8 resulted in two accepted vendors, while a call wave of size 10 resulted in three accepted vendors, on average.

At block 1625, in some embodiments, the network-based system 105 may compute a prediction of the best call wave size based on these comparative statistics discussed and accessed at blocks 1615 and 1620. For example, the customer may have specified that he wishes to receive three accepted calls from vendors. Using the example above, the network-based system 105 may then determine that the call wave of size 10 should be initiated in order to have a strong possibility that the vendors will accept the customer's service request. As another example, the system may have a default number of vendor acceptances desired through the first call wave, e.g. two vendor acceptances. Using the example above, the network-based system 105 may then determine that the call wave size of eight should be initiated in order to have a strong possibility that the vendors will have a sufficient number of acceptances. Having determined a number to set the call wave, the network-based system 105 may then proceed to initiate a call wave of that size.

Figure 17:
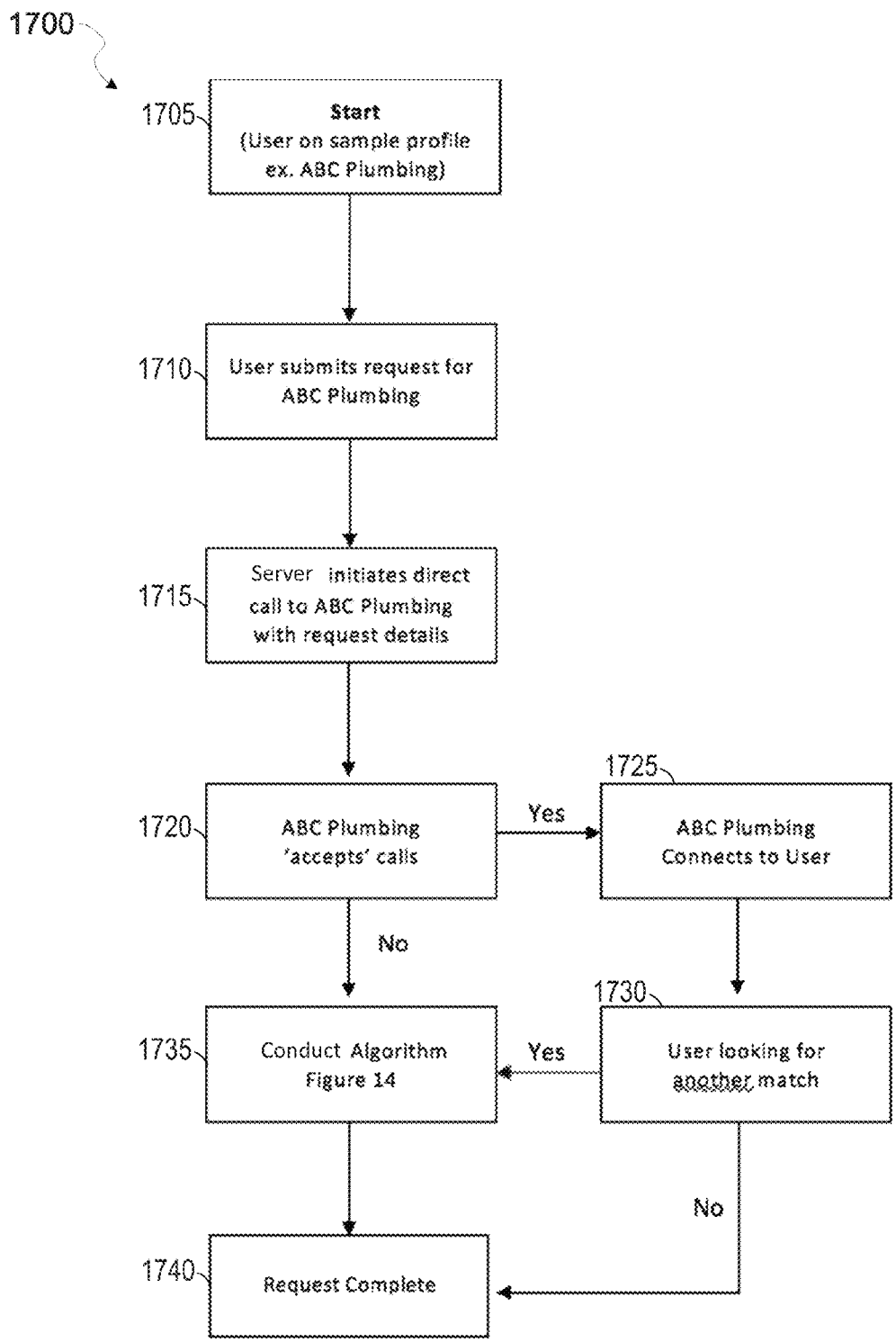
FIG. 17 shows a variation of the call wave method that includes the customer or user first contacting a merchant or vendor directly for a desired service, according to some embodiments.

Referring to FIG. 17, flowchart 1700 shows a variation of the call wave method that includes the customer or user first contacting a merchant or vendor directly for a desired service, according to some embodiments. In this example process, at block 1705, the process starts with the user or customer attempting to contact a first vendor, such as ABC plumbing. The user may attempt to contact this vendor through the vendor website or in other cases call the vendor using a listed number. This example proceeds through the web based approach, and includes the user submitting a request for the services of ABC plumbing, at block 1710. The request may include various biographical information about the user and the nature of the desired services, for example.

At block 1715, the network-based system of aspects of the present disclosure may initiate the direct call to the vendor with the request details provided in block 1710. In this example, under the web-based approach, when the user selects the chosen vendor and initiates the contact, the network-based system may have assigned a number controlled by the network-based system in place of a number that chosen first vendor controls. This assigned number is then activated and dialed when the user selects the chosen vendor. Once this connection occurs between the user's phone and the assigned number controlled by the network-based system, the network-based system then initiates the phone call to the chosen vendor directly. This may be accomplished using the conference bridge infrastructure of the network-based system, previously mentioned above, as an example.

At block 1720, a determination is made whether the vendor accepts the call performed by the server and initiated by the user. If the vendor accepts the call, then at block 1725, the vendor is bridged over to the user directly. If the correspondence is successful, then the first chosen vendor may provide services to the user, and the correspondence may complete for this time.

However, if the first vendor does not pick up the call, then in some embodiments, the procedure may move to block 1735, where the call wave algorithm FIG. 14 is initiated to allow the user additional options in finding a service using other vendors. In addition, if the correspondence between the user and the first vendor is not successful, then the network-based system, at block 1730, may give the user additional chances to look for other matches. If the user accepts, then the process moves again to block 1735. If the user does not wish to try for other vendors to provide the same service, then at block 1740, the process completes.

In this way, the network-based system may conveniently provide additional help and support to the user who desires to find a particular service. The user is already in the mindset of trying to find help for the particular service, and aspects of the present disclosure can vary capably meet that need. This is also convenient for the user because user then does not need to do additional searching, where instead network-based system already gives the user some of the best rated alternatives through the call wave functionality.

Example pseudocode for conducting a direct call variation according to aspects of the present disclosure are provided below:

User is on sample profile page for a company ABC (block 1705);
User submits request for company ABC (block 1710);
Function call to Network-based system Direct Connect API
   passing parameters including:
   user phone number
   user location
   description of request
   company ABC phone number
   category for request submitted
   user name (optional)
   user email address (optional)
Server generates direct call (call leg 1) to company ABC
   with given information of user request including user
   location, and request description (block 1715);
if company ABC accepts (block 1720):
   Server generates call to user (call leg 2) and connects the
      call to company ABC (call leg 1) (block 1725);
   Server generates automated message asking if user would
      like to speak to another company;
   If user would like to speak to another company, follow
      FIG. 14 algorithm to generate multiple requests in call
      wave (block 1730);
Else:
   Follow FIG. 14 to create new request (block 1735);
Request Complete (block 1740).

Figure 18:
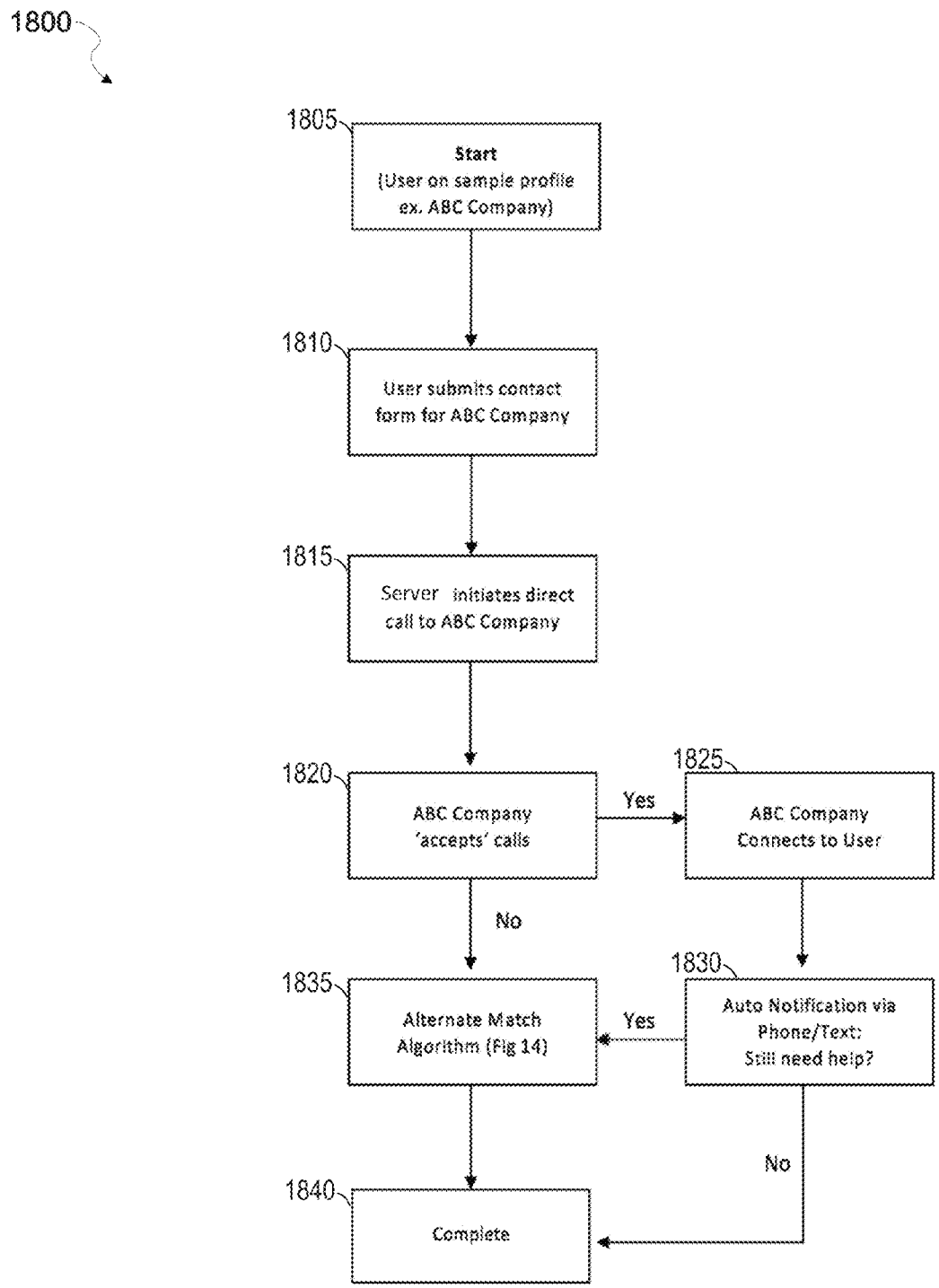
FIG. 18 provides a variation of the direct call initial process similar to the disclosures in FIG. 17, this time showing a web-based variation including correspondence to the user for whether the user still needs help, according to some embodiments.

Referring to FIG. 18, flowchart 1800 provides a variation of the direct call initial process similar to the disclosures in FIG. 17, this time showing a web-based variation including correspondence to the user for whether the user still needs help, according to some embodiments. Here, the user may start at a sample web-based profile of the desired vendor to be contacted, such as the vendors webpage or an intermediary page that features the vendor, at block 1805. The user may then contact the company by clicking on some button or selection that initiates the contact. At block 1815, the form of contact to the first vendor may be controlled by the network-based system, who may then initiate the direct contact to the first vendor. Blocks 1820, 1825, and 1835, may be similar to the blocks described in FIG. 17 as a result. In addition, at block 1830, if the correspondence between the user and the first vendor is not successful in the sense that no agreement could be reached, the network-based system may shortly thereafter send an auto notification via phone message or text to the user, asking whether the user wishes to keep searching for other possible matches for the desired service. The process may then proceed either to block 1835 if the user wishes to find other possible matches, or may complete at block 1840 if the user declines.

Figure 19:
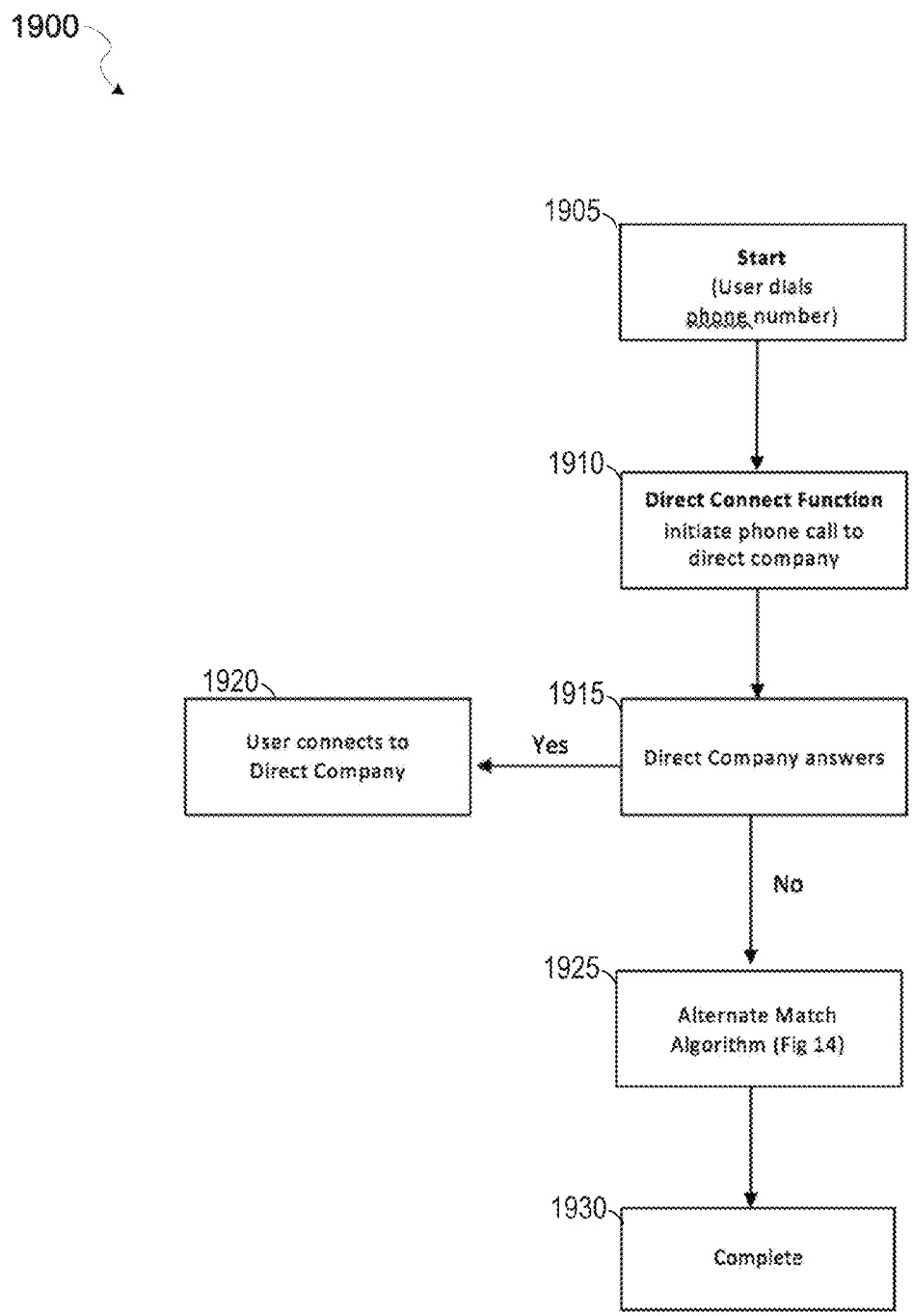
FIG. 19 shows another variation of the direct connect initial process, this time including the direct connect function using a phone number rather than connecting through web-based or other graphical means, according to some embodiments.

Referring to FIG. 19, flowchart 1900 shows another variation of the direct connect initial process, this time including the direct connect function using a phone number rather than connecting through web-based or other graphical means (e.g., over Facebook, LinkedIn, hyperlink, etc.). At block 1905, the user may start by dialing a phone number in connection with the desired first vendor. The user may obtain the phone number of the first vendor through various conventional means, but the number listed may be controlled by the network-based system. Once that number is called, the network-based system may initiate the direct call to the first vendor, at block 1910, and similar to as previously described in FIG. 17. Blocks 1915, 1920, in 1925 may be similar to those processes described in FIGS. 17 and 18 once the correspondence to the first vendor is initiated by the network-based system. Ultimately, the process may complete at block 1930 after allowing the user an additional opportunity to contact other vendors in the event that the first vendor correspondence does not work out.

Figure 20:
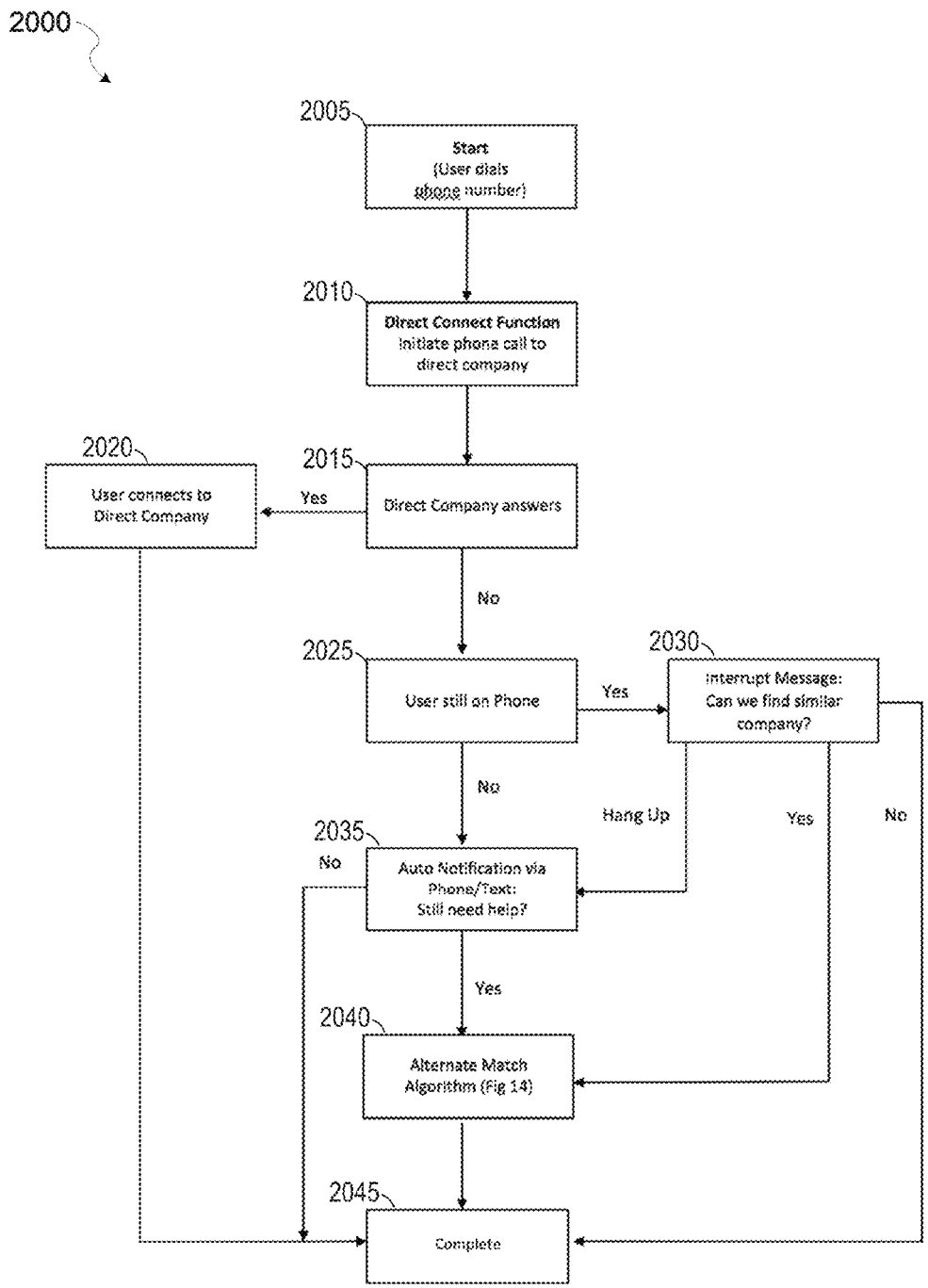
FIG. 20 provides another variation of the direct call initial process, this time including functionality for interjecting into the direct call made between the user and the first vendor, according to some embodiments.

Referring to FIG. 20, flowchart 2000 provides another variation of the direct call initial process, this time including functionality for interjecting into the direct call made between the user and the first vendor, according to some embodiments. In this example, the process starts at block 2005 with the user dialing the phone number of the first vendor directly. This number may be controlled by the first vendor. At block 2010, the call may be made directly to the first vendor, and at block 2015, a determination is made of whether the first vendor answers the phone or not. At block 2020, if the user is placed into contact with the first vendor directly, and the services are provided, then the process completes at block 2045. However, at block 2025, if it appears that the first vendor is not going to answer and the user is still on the phone, then at block 2030, the network-based system may intercept the call and provide an interrupt message to ask the user if he or she wishes to contact another company to perform the similar desired service. This may be accomplished through a phone telephony API controlled by the network-based system, that if the call is still in progress between the user and the first vendor, the API may be able to determine after a predetermined number of rings or whether enough time has elapsed, that the first vendor will most likely not pick up the phone. From here the call may then be forwarded to a number controlled by the network-based system which may then allow the network-based system to relay the interrupt message to the user, asking whether the user wishes to find another merchant. Thus, flowchart 2000 describes a variation where the initial phone number is not one controlled by the network-based system, but still the user may be placed into contact with other possible alternative matches.

In some embodiments, the user may hang up before the interrupt message is provided, or may simply not realize that a follow-up correspondence is being attempted. In other cases, the user may hang up quickly and before the interrupt message can be delivered. In either scenario, at block 2035, an auto notification message via phone or text may be delivered to the user through the forwarded number controlled by the network-based system.

If the user wishes to find a new company, based on a response from either the interrupt message at block 2030 or the auto notification message at block 2035, the process may then proceed to block 2040, where the alternative matching may be performed, e.g., perform the process in FIG. 14. In all other cases, if the user wishes to not perform any additional searching, the process may complete at block 2045.

In some embodiments, the flowchart 2000 may be similarly applied to a web based approach, where the initial contact is also one not controlled by the network-based system. For example, various graphical means that lead to a digital voice contact may still be controlled initially by the first vendor. However, the network-based system may utilize an API to intercept the communication if no voice contact is reached for the first vendor.

Figure 21:
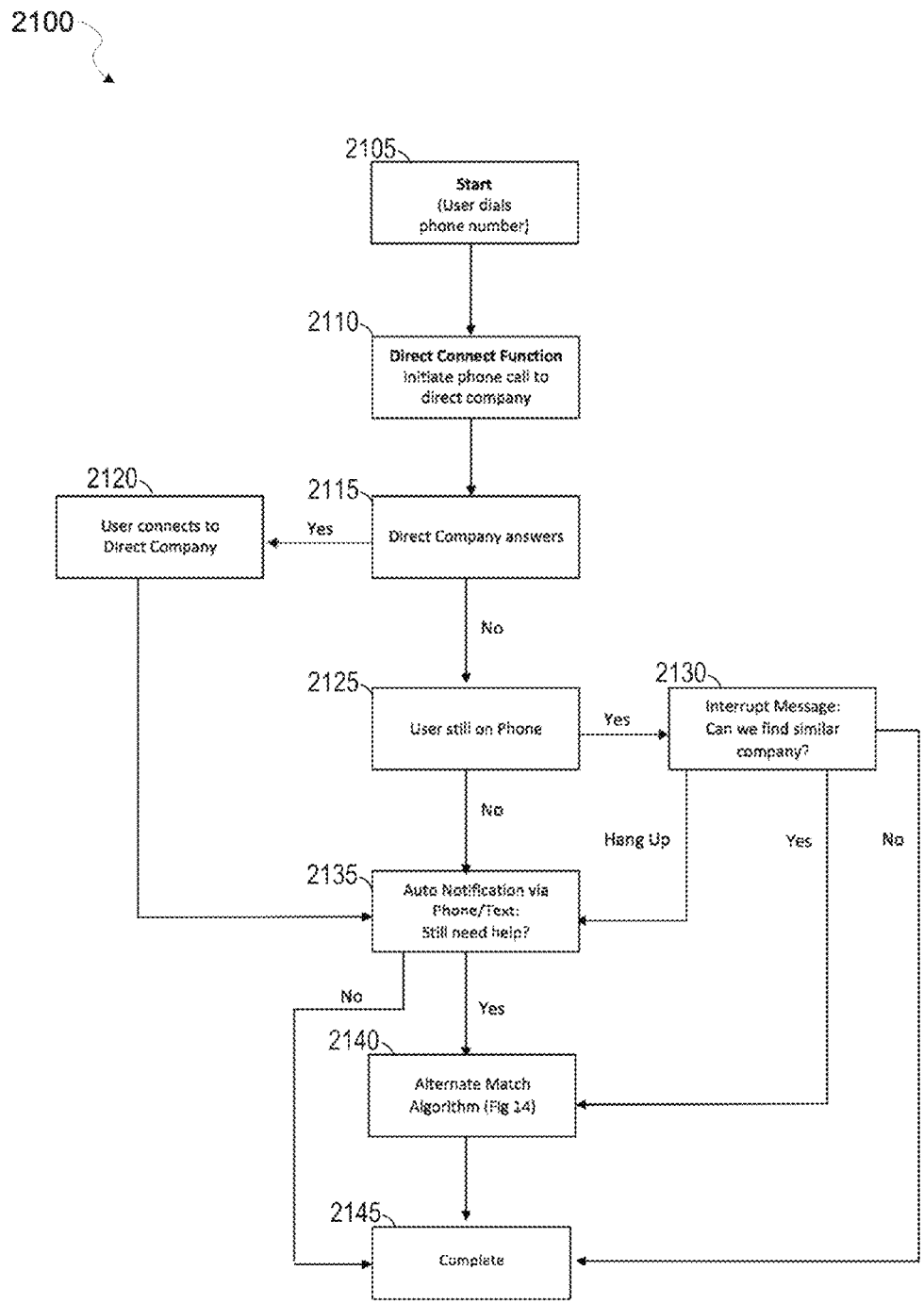
FIG. 21 provides a slight variation to the direct connect initial process described in FIG. 20, this time including an additional feature for following up with the user after the user connects with the first vendor to ask if the user needs additional help, according to some embodiments.

Referring to FIG. 21, flowchart 2100 provides a slight variation to the direct connect initial process described in FIG. 20, this time including an additional feature for following up with the user after the user connects with the first vendor to ask if the user needs additional help, according to some embodiments. Blocks 2105, 2110, 2115, 2120, 2125, 2130, 2140, and 2145 may be similar to their corresponding blocks in FIG. 20. However, the additional variation here includes the network-based system also intercepting the portion of the call with the user when the user has finished corresponding with the first vendor initially contacted, after block 2120. Again, the network-based system may utilize a phone telephony API that may be configured to intercept the call or at least attacked when the call has finished. Block 2120 may then proceed to block 2135, where the network-based system may send a notification message via phone or text to the user to ask if the user still needs help. In some embodiments, this message may be sent automatically after every initial call completes, or in other cases the message may be sent only if it is determined or estimated that the user has not succeeded in securing the desired service from the first vendor. This may be accomplished by the phone telephony API monitoring how long the call occurs between the user and the first vendor. For example, if the placed call occurs for less than one minute, and may be determined that the service cannot be provided, and so it may seem more beneficial to ask the user if help is still needed in these cases.

Figure 22:
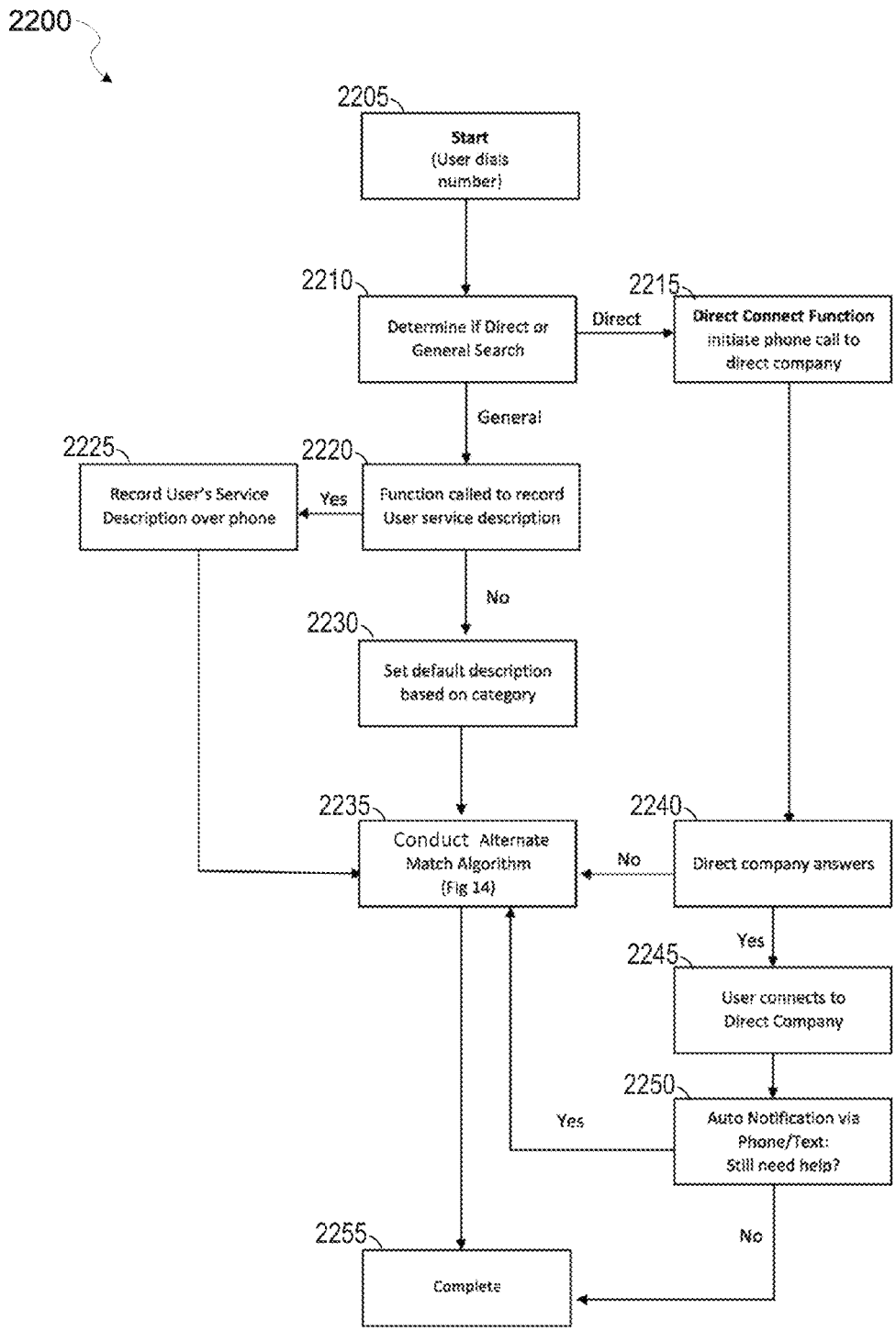
FIG. 22 shows an additional variation direct call initial process, in this case including the network-based system determining whether the user is making a direct call or performing a general search, according to some embodiments.

Referring to FIG. 22, flowchart 2200 shows an additional variation direct call initial process, in this case including the network-based system determining whether the user is making a direct call or performing a general search, according to some embodiments. The process starts at block 2205, where the user may initiate contact to a vendor, such as by dialing a number. Proceeding to block 2210, the network-based system may determine if the initiated contact by the user is for a direct call to a vendor or for a general search. This may be accomplished through the determination of what number is being called or contacted by the user. Some of the numbers may specify a direct search to a specific vendor, leading to block 2215. Other numbers may be specified for a general search, leading to block 2220. Both of these types of numbers may be owned and controlled by the network-based system, and therefore either contact may draw the user to the platform of the network-based system, whereby it can be determined based on which numbers dialed what type of search at its.

If the user has elected to initiate a direct call or search, at block 2215, the process may proceed through the direct call functionality described in the previous figures, and proceeding to block 2240. On the other hand, if it is determined that the user has elected to initiate a general search, at block 2220, the process may proceed to perform the general search functionality described in the previous figures. In some embodiments, this process may include first recording the service description of the user in order to determine what kind of services and searching should be conducted. In some embodiments, the user may elect to provide this service description, in which case at block 2225, the network-based system may record the user's service description over the phone. In other cases a general description may be provided if the user does not wish to add more detail, proceeding to block 2230, where a default description is provided based on a select category of the user. From blocks 20 to 25, 2230, 2240, and block 2250, the call wave algorithm described in FIG. 14 may be initiated at block 2235. The process may move from block 2242 block 2250 via block 2245 if the user is placed in contact with the first vendor initially, but the user may be unsatisfied with the first contact and may elect to conduct additional searching after a notification or interrupt message is provided at block 2250. Finally, the process may be completed at block 2255 after a general search is conducted for the user has elected to not perform any other search.

Figure 23:
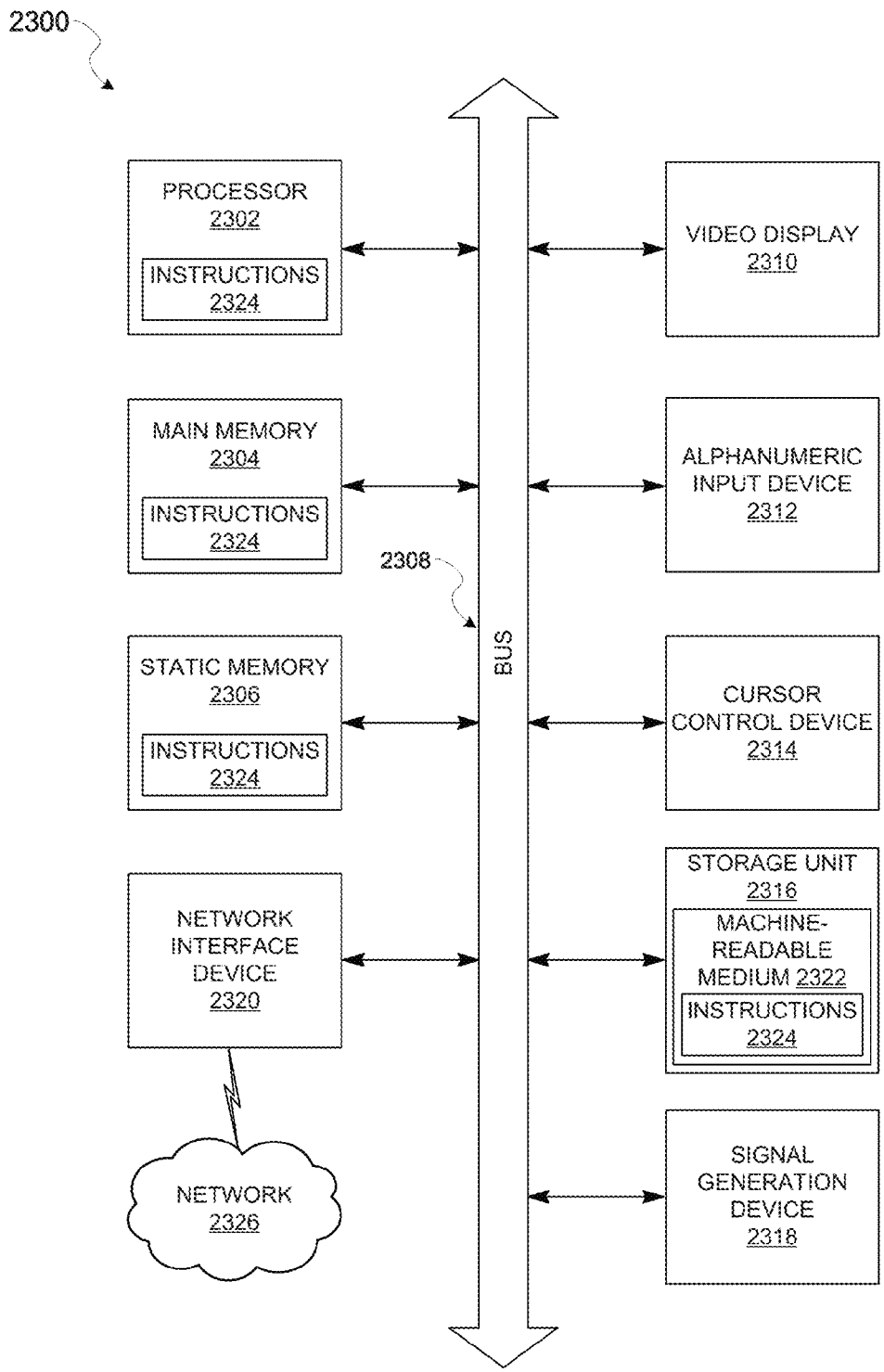
FIG. 23 is a block diagram illustrating components of a machine, according to some example embodiments, able to read instructions from a machine-readable medium and perform any one or more of the methodologies discussed herein.

Referring to FIG. 23, the block diagram illustrates components of a machine 2300, according to some example embodiments, able to read instructions 2324 from a machine-readable medium 2322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 23 shows the machine 2300 in the example form of a computer system (e.g., a computer) within which the instructions 2324 (e.g., software, a program, an application, an applet, an app, or other executable code) for causing the machine 2300 to perform any one or more of the methodologies discussed herein may be executed, in whole or in part.

In alternative embodiments, the machine 2300 operates as a standalone device or may be connected (e.g., networked) to other machines. In a networked deployment, the machine 2300 may operate in the capacity of a server machine 110 or a client machine in a server-client network environment, or as a peer machine in a distributed (e.g., peer-to-peer) network environment. The machine 2300 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2324, sequentially or otherwise, that specify actions to be taken by that machine. Further, while only a single machine 2300 is illustrated, the term "machine" shall also be taken to include any collection of machines that individually or jointly execute the instructions 2324 to perform all or part of any one or more of the methodologies discussed herein.

The machine 2300 includes a processor 2302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2304, and a static memory 2306, which are configured to communicate with each other via a bus 2308. The processor 2302 may contain microcircuits that are configurable, temporarily or permanently, by some or all of the instructions 2324 such that the processor 2302 is configurable to perform any one or more of the methodologies described herein, in whole or in part. For example, a set of one or more microcircuits of the processor 2302 may be configurable to execute one or more modules (e.g., software modules) described herein.

The machine 2300 may further include a video display 2310 (e.g., a plasma display panel (PDP), a light emitting diode (LED) display, a liquid crystal display (LCD), a projector, a cathode ray tube (CRT), or any other display capable of displaying graphics or video). The machine 2300 may also include an alphanumeric input device 2312 (e.g., a keyboard or keypad), a cursor control device 2314 (e.g., a mouse, a touchpad, a trackball, a joystick, a motion sensor, an eye tracking device, or other pointing instrument), a storage unit 2316, a signal generation device 2318 (e.g., a sound card, an amplifier, a speaker, a headphone jack, or any suitable combination thereof), and a network interface device 2320.

The storage unit 2316 includes the machine-readable medium 2322 (e.g., a tangible and non-transitory machine-readable storage medium) on which are stored the instructions 2324 embodying any one or more of the methodologies or functions described herein, including, for example, any of the descriptions of FIGS. 1-22. The instructions 2324 may also reside, completely or at least partially, within the main memory 2304, within the processor 2302 (e.g., within the processor's cache memory), or both, before or during execution thereof by the machine 2300. The instructions 2324 may also reside in the static memory 2306.

Accordingly, the main memory 2304 and the processor 2302 may be considered machine-readable media 2322 (e.g., tangible and non-transitory machine-readable media). The instructions 2324 may be transmitted or received over a network 2326 via the network interface device 2320. For example, the network interface device 2320 may communicate the instructions 2324 using any one or more transfer protocols (e.g., HTTP). The machine 2300 may also represent example means for performing any of the functions described herein, including the processes described in FIGS. 1-22.

In some example embodiments, the machine 2300 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 2322 able to store data temporarily or permanently and may be taken to include, but not be limited to, random-access memory (RAM), read-only memory (ROM), buffer memory, flash memory, and cache memory. While the machine-readable medium 2322 is shown in an example embodiment to be a single medium, the term "machine-readable medium" should be taken to include a single medium or multiple media (e.g., a centralized or distributed database 115, or associated caches and servers) able to store instructions 2324. The term "machine-readable medium" shall also be taken to include any medium, or combination of multiple media, that is capable of storing the instructions 2324 for execution by the machine 2300, such that the instructions 2324, when executed by one or more processors of the machine 2300 (e.g., processor 2302), cause the machine 2300 to perform any one or more of the methodologies described herein, in whole or in part. Accordingly, a "machine-readable medium" refers to a single storage apparatus or device 130m 140, or 150, as well as cloud-based storage systems or storage networks that include multiple storage apparatus or devices 130, 140 or 150. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 2322 is non-transitory in that it does not embody a propagating signal. However, labeling the tangible machine-readable medium 2322 as "non-transitory" should not be construed to mean that the medium is incapable of movement; the medium should be considered as being transportable from one physical location to another. Additionally, since the machine-readable medium 2322 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 2322 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 2302 or a group of processors 2302) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 2302 or other programmable processor 2302. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 2308) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 2302 that are temporarily configured (e.g., by software) or permanently configured to perform the relevant operations. Whether temporarily or permanently configured, such processors 2302 may constitute processor-implemented modules that operate to perform one or more operations or functions described herein. As used herein, "processor-implemented module" refers to a hardware module implemented using one or more processors 2302.

Similarly, the methods described herein may be at least partially processor-implemented, a processor 2302 being an example of hardware. For example, at least some of the operations of a method may be performed by one or more processors 2302 or processor-implemented modules. As used herein, "processor-implemented module" refers to a hardware module in which the hardware includes one or more processors 2302. Moreover, the one or more processors 2302 may also operate to support performance of the relevant operations in a "cloud computing" environment or as a "software as a service" (SaaS). For example, at least some of the operations may be performed by a group of computers (as examples of machines 2300 including processors 2302), with these operations being accessible via a network 2326 (e.g., the Internet) and via one or more appropriate interfaces (e.g., an API).

The performance of certain operations may be distributed among the one or more processors 2302, not only residing within a single machine 2300, but deployed across a number of machines 2300. In some example embodiments, the one or more processors 2302 or processor-implemented modules may be located in a single geographic location (e.g., within a home environment, an office environment, or a server farm). In other example embodiments, the one or more processors 2302 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 2300 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for facilitating a search for a service provider to provide a service for a user, the method comprising:
   accessing, by a network-based system, a request from the user to obtain a professional service from a local service provider;
   conducting a call wave procedure of a plurality of service providers relevant to providing the request to the user, the call wave procedure comprising contacting, by the network-based system, the plurality of service providers in parallel with one another and inquiring whether each of the contacted service providers will accept a communication with the user to provide the service;
   receiving an indication from a first service provider among the contacted service providers in parallel that said service provider will accept the communication with the user; and
   initiating, by the network-based system, a conference communication between the user and the first service provider while both the first service provider and the user remain in communication with the network-based system.

2. The method of claim 1, further comprising determining an optimal set of service providers to be the plurality of service providers to contact during the call wave procedure, said determining comprising:
   accessing service providers within a geographical proximity to the user;
   accessing a quality score for each of the service providers within the geographical proximity;
   accessing a social media score for each of the service providers within the geographical proximity;
   accessing a call analytics score for each of the service providers within the geographical proximity;
   computing a performance score for each of the service providers within the geographical proximity based on the quality score, the social media score, and the call analytics score;
   ranking the service providers within the geographical proximity based on their respective performance scores; and
   selecting a top ranking of the service providers to be called in the call wave procedure.

3. The method of claim 2, wherein said determining the optimal set of service providers further comprises:
   determining whether each of the service providers within the geographical proximity provides a priority bid to the network-based system; and
   weighting the performance score of each of the service providers corresponding to a magnitude of the priority bid provided by said service provider;
   wherein the ranking is based further on the weighted performance score.

4. The method of claim 1, further comprising computing a call wave size representing a number of service providers that is to be contacted in parallel during the call wave procedure.

5. The method of claim 4, wherein said computing of the call wave size comprises:
   accessing analogous call wave procedures of similar service requests in similar markets to the request provided by the user, based on a type of service requested by the user and a geographic location of the user;
   determining similar call wave sizes of the analogous call wave procedures; and
   computing a predicted call wave size for the request of the user based on the similar call wave sizes.

6. The method of claim 1, further comprising and before conducting the call wave procedure:
   accessing a direct call query to a first service provider made by the user;
   initiating, by the network-based system, the direct call to the first provider on behalf of the user;
   determining that the first service provider is not accepting the direct call; and
   in response, querying the user, by the network-based system, if the user would like to search for additional service providers using the call wave procedure.

7. The method of claim 6, wherein the direct call query to the first service provider made by the user is a phone call directed to the first service provider.

8. The method of claim 6, wherein the direct call query to the first service provider made by the user is a web-based query directed to the first service provider.

9. The method of claim 1, further comprising and before conducting the call wave procedure:
   accessing a direct call query to a first service provider made by the user;
   determining that the first service provider is not accepting the direct call; and
   in response:
      intercepting, by the network-based system, the direct call made by the user querying the user; and
      querying the user, by the network-based system, if the user would like to search for additional service providers using the call wave procedure.

10. The method of claim 1, further comprising and before conducting the call wave procedure:
    accessing a direct call query to a first service provider made by the user;
    after the user has communicated with the first service provider, determining that the first service provider is not agreeing to provide the requested service to the user; and
    in response:
       querying the user, by the network-based system, if the user would like to search for additional service providers using the call wave procedure.

11. The method of claim 1, further comprising and before conducting the call wave procedure:
    after accessing the request from the user to obtain a professional service from a local service provider:
       determining, by the network-based system, whether the request from the user is a direct call request to directly contact a first service provider or the request from the user is a general search to find the service provider;
       if the request is a direct call request:
          initiating, by the network-based system, the direct call to the first provider on behalf of the user;
          determining that the first service provider is not accepting the direct call; and
          in response, querying the user, by the network-based system, if the user would like to search for additional service providers using the call wave procedure; and
       if the request is a general search request:
          obtaining a description of the requested service for use in conducting the call wave procedure.

12. A system for facilitating a search for a service provider to provide a service for a user, the system comprising:
    at least one memory; and
    at least one processor coupled to the at least one memory and configured to:

access a request from the user to obtain a professional service from a local service provider;

conduct a call wave procedure of a plurality of service providers relevant to providing the request to the user, the call wave procedure comprising contacting, by the network-based system, the plurality of service providers in parallel with one another and inquiring whether each of the contacted service providers will accept a communication with the user to provide the service;

receive an indication from a first service provider among the contacted service providers in parallel that said service provider will accept the communication with the user; and initiate a conference communication between the user and the first service provider while both the first service provider and the user remain in communication with the network-based system.

* * * * *